US010337529B2

United States Patent
Karim et al.

(10) Patent No.: US 10,337,529 B2
(45) Date of Patent: Jul. 2, 2019

(54) TURBOCHARGER COMPRESSOR NOISE REDUCTION SYSTEM AND METHOD

(71) Applicant: Ford Global Technologies, LLC, Dearborn, MI (US)

(72) Inventors: Ahsanul Karim, Canton, MI (US); Chris David Tiernan, Commerce Township, MI (US); Keith D. Miazgowicz, Dearborn, MI (US); Timothy J. Knott, Canton, MI (US); Anthony Morelli, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 445 days.

(21) Appl. No.: 15/344,435

(22) Filed: Nov. 4, 2016

(65) Prior Publication Data

US 2017/0074291 A1   Mar. 16, 2017

Related U.S. Application Data

(63) Continuation-in-part of application No. 14/841,391, filed on Aug. 31, 2015, now Pat. No. 9,938,991,
(Continued)

(51) Int. Cl.
| | |
|---|---|
| *F04D 29/66* | (2006.01) |
| *F04D 17/10* | (2006.01) |
| *F04D 29/28* | (2006.01) |
| *F04D 29/42* | (2006.01) |
| *F04D 27/00* | (2006.01) |

(Continued)

(52) U.S. Cl.
CPC ............ *F04D 29/665* (2013.01); *F02B 33/40* (2013.01); *F02C 7/045* (2013.01); *F02M 35/12* (2013.01); *F04D 17/10* (2013.01);

*F04D 27/009* (2013.01); *F04D 29/284* (2013.01); *F04D 29/4206* (2013.01); *F04D 29/4213* (2013.01); *F04D 29/441* (2013.01); *F04D 29/667* (2013.01); *F05D 2220/40* (2013.01); *F05D 2250/51* (2013.01); *F05D 2260/963* (2013.01)

(58) Field of Classification Search
CPC ...... F04D 29/665; F04D 17/10; F04D 27/009; F04D 29/284; F04D 29/4206; F04D 29/4213; F04D 29/441; F04D 29/667; F02M 35/12; F05D 2220/40; F05D 2250/51; F05D 2260/963
USPC ....................................... 415/58.4
See application file for complete search history.

(56) References Cited

U.S. PATENT DOCUMENTS

| | | |
|---|---|---|
| 4,673,331 A | 6/1987 | Kolb |
| 4,689,959 A | 9/1987 | Houkita et al. |

(Continued)

FOREIGN PATENT DOCUMENTS

| | | |
|---|---|---|
| DE | 3908285 C1 | 6/1990 |
| SU | 1486067 A3 | 6/1989 |

*Primary Examiner* — Aaron R Eastman
(74) *Attorney, Agent, or Firm* — Julia Voutyras; McCoy Russell LLP

(57) ABSTRACT

Methods and systems are provided for a compressor of a turbocharger of an engine. In one example, a compressor may include a flow passage and a resonance chamber surrounding the flow passage, with the flow passage fluidly coupled with the resonance chamber by a recirculation passage, a bleed passage, and a plurality of apertures positioned between the recirculation passage and the bleed passage. Flowing fluid from the resonance chamber, through the apertures, and into the flow passage may reduce a noise level of the compressor.

19 Claims, 13 Drawing Sheets

Related U.S. Application Data which is a continuation of application No. 13/528,622, filed on Jun. 20, 2012, now Pat. No. 9,303,561.

(51) Int. Cl.
*F02M 35/12* (2006.01)
*F02B 33/40* (2006.01)
*F02C 7/045* (2006.01)
*F04D 29/44* (2006.01)

(56) References Cited

U.S. PATENT DOCUMENTS

| | | |
|---|---|---|
| 4,944,660 A | 7/1990 | Joco |
| 5,025,629 A | 6/1991 | Woollenweber |
| 6,145,313 A | 11/2000 | Arnold |
| 7,942,625 B2 | 5/2011 | Sirakov et al. |
| 8,690,524 B2 | 4/2014 | Yin et al. |
| 2002/0157396 A1 | 10/2002 | Conicella |
| 2004/0247462 A1 | 12/2004 | Carter |
| 2005/0196272 A1 | 9/2005 | Nikpour |
| 2006/0275113 A1 | 12/2006 | Chen |
| 2007/0217902 A1 | 9/2007 | Sirakov et al. |
| 2008/0181764 A1 | 7/2008 | Hirakawa et al. |
| 2008/0247870 A1 | 10/2008 | Sirakov et al. |
| 2008/0292449 A1 | 11/2008 | Lefevre |
| 2010/0043761 A1 | 2/2010 | Joergl et al. |
| 2010/0098532 A1 | 4/2010 | Diemer et al. |
| 2010/0129209 A1 | 5/2010 | Sugimoto et al. |
| 2010/0205949 A1 | 8/2010 | Bolda et al. |
| 2010/0221107 A1 | 9/2010 | Anschel et al. |
| 2010/0266395 A1 | 10/2010 | Hermann et al. |
| 2010/0322757 A1 | 12/2010 | Hall et al. |
| 2010/0322778 A1 | 12/2010 | Caroll, III et al. |
| 2011/0131976 A1 | 6/2011 | Krätschmer et al. |
| 2011/0214421 A1 | 9/2011 | Schmitt et al. |

TURBOCHARGER COMPRESSOR NOISE REDUCTION SYSTEM AND METHOD

CROSS REFERENCE TO RELATED APPLICATIONS

The present application is a continuation-in-part of U.S. patent application Ser. No. 14/841,391, entitled "TURBOCHARGER COMPRESSOR NOISE REDUCTION SYSTEM AND METHOD," filed on Aug. 31, 2015. U.S. patent application Ser. No. 14/841,391 is a continuation of U.S. patent application Ser. No. 13/528,622, entitled "TURBOCHARGER COMPRESSOR NOISE REDUCTION SYSTEM AND METHOD," filed on Jun. 20, 2012, now U.S. Pat. No. 9,303,561. The entire contents of each of the above-referenced applications are hereby incorporated by reference in their entirety for all purposes.

FIELD

The present application relates to methods and systems for compressing engine intake system air using a boosting system such as a turbocharger, and specifically turbocharger arrangements, methods and systems wherein noise generated by the turbocharger compressor is reduced.

BACKGROUND AND SUMMARY

Vehicle engines may include turbochargers, or superchargers configured to force an increased amount of air mass into an engine's intake manifold and combustion chamber by compressing intake air with a turbine compressor. In some cases the compressor may be driven by a turbine configured to capture energy from a flow of exhaust gas from the engine. In transient and steady state operation of compressors, there are known noise, vibration, and harshness (NVH) issues characterized by a whoosh noise, or simply whoosh. The whoosh condition may cause undesirable or unacceptable levels of NVH, and may also lead to turbocharger/engine surge. In particular, turbochargers including a compressor with a ported shroud casing experience issues with noise resulting from a blade pass frequency (BPF) of an impeller of the compressor.

Attempts have been made to mitigate noise from turbocharger compressors. One attempt includes providing small channels to disturb a boundary layer of an incoming fluid flow field to the turbocharger. Another attempt to mitigate noise is disclosed in US Patent publication 2010/0098532 to Diemer et al. Diemer et al. attempts to reduce turbocharger stall noise by providing a groove that straddles a leading edge of splitter blades of the compressor. The groove is located downstream from a leading edge of main blades to provide a path for fluid around a rotating stall.

Other attempts to minimize compressor noise have provided various re-circulation passages wherein part of the flow is re-circulated from a downstream position to an upstream position via a passage separate from a main flow passage. One example of such an approach is disclosed in U.S. Pat. No. 7,942,625 to Sirakov et al. Sirakov provides a bleed passage downstream from a blade leading edge that enables a portion of fluid flowing through the compressor to re-circulate to an upstream location via an internal cavity and injection passage.

However, the inventors herein have recognized potential issues with such systems. As one example, these approaches fail to investigate compressor fluid flow path in an area of the main blade leading edge, and they also fail to effectively address whoosh noise. Additionally, these approaches do not target a broadband frequency range of whoosh noise with minimal effect on the fluid flow field, and they do not specifically address the issue of noise resulting from the blade pass frequency of the compressor impeller.

In one example, the issues described above may be addressed by a compressor, comprising: a casing; a flow passage formed by an interior surface of the casing; a compressor wheel located in the casing downstream of the flow passage and having at least one main blade; a resonance chamber formed within the casing, surrounding the flow passage, and fluidly coupled to the flow passage via a recirculation passage and a bleed passage; and an aperture formed between the resonance chamber and the flow passage, and coupled to the flow passage between the recirculation passage and the bleed passage. As one example, the compressor may additionally include a flow disrupting feature formed by the flow passage and the aperture may be one of a plurality of apertures. The flow disrupting feature may include a change in cross sectional area of the flow path that when located at the leading edge of the main blades of the compressor may decrease whoosh. Additionally, embodiments may include components of a flow disrupting feature that may be sized and proportioned in accordance with a particular mathematical formula which relates the components in a specified way to one or more particular frequencies of whoosh noise. In this way, the combination of the flow disrupting feature and the apertures may disrupt the flow path of air through the compressor and a broad band frequency range defined by whoosh can be targeted, thereby reducing a noise level produced by the compressor.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-26 are drawn to scale, although other relative dimensions may be used.

DETAILED DESCRIPTION

The following description relates to systems and methods for a compressor of a turbocharger. A vehicle system, such as the vehicle system shown by FIG. 1, may include an engine, an engine intake system, an engine exhaust system, and a turbocharger coupled between the intake system and exhaust system. The turbocharger, such as the turbocharger shown by FIG. 2, includes a turbine positioned within the exhaust system and a compressor positioned within the intake system, with the turbine and compressor coupled to each other via a shaft. Exhaust gas from the engine may flow through the turbocharger and spin the turbine, with a rotation of the turbine resulting in a rotation of an impeller of the compressor. As the impeller rotates, air may be drawn into an inlet of the compressor and flow through a central passage (which may be referred to herein as a flow passage or inlet flow passage) of the compressor, such as the flow passage shown by FIG. 3.

Figure 17:
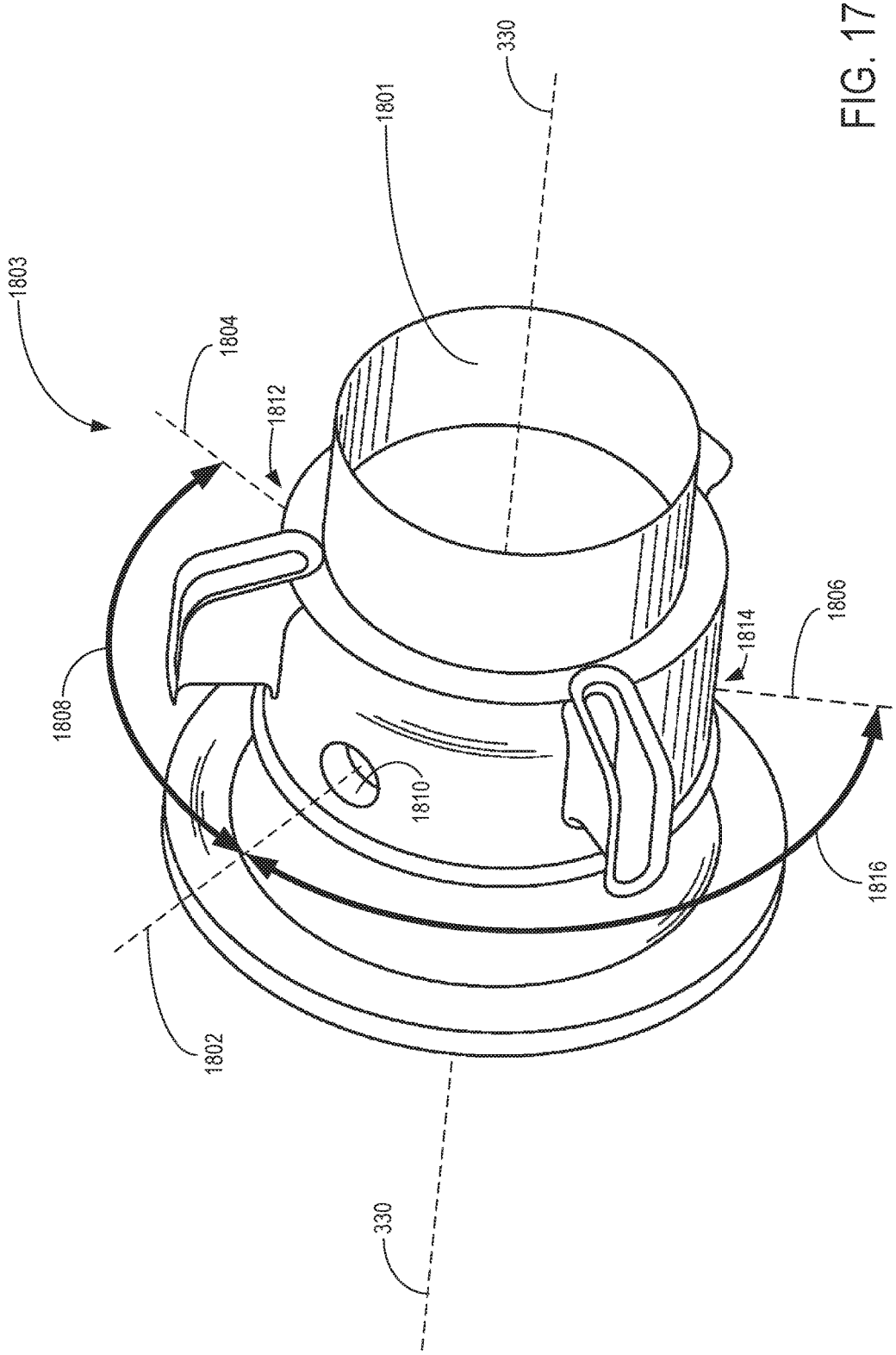
FIG. 17 shows a perspective view of an inlet of a compressor, with the inlet including a plurality of flow disrupting apertures.
Figure 18:
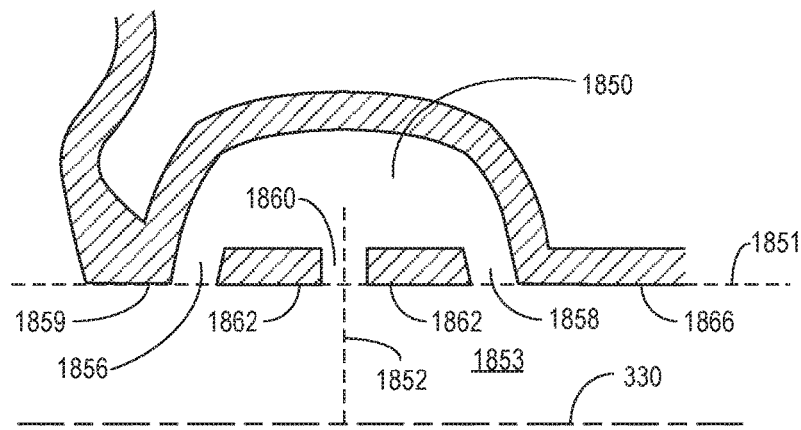
FIGS. 18-20 show various embodiments of compressors including a plurality of flow disrupting apertures.
Figure 19:
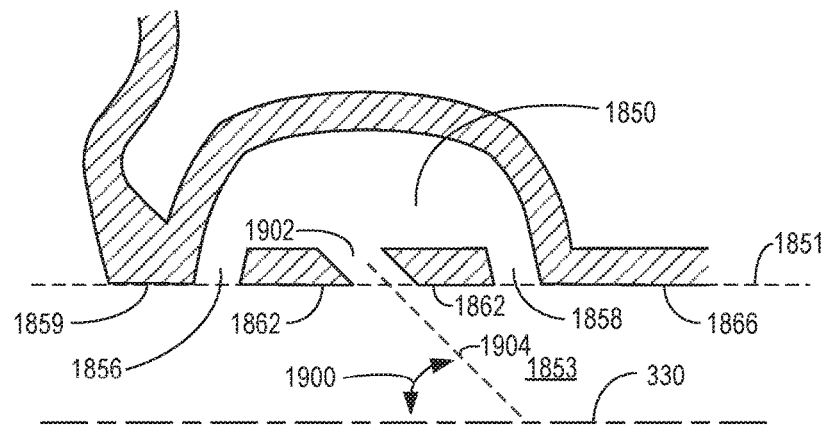
Figure 20:
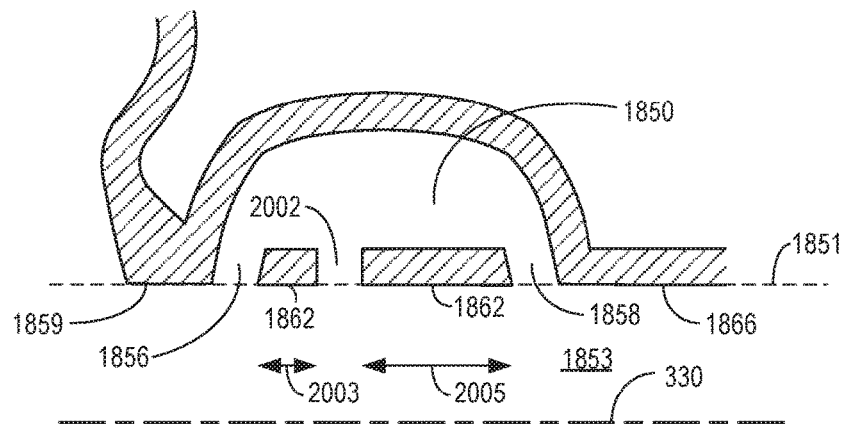
Figure 25:
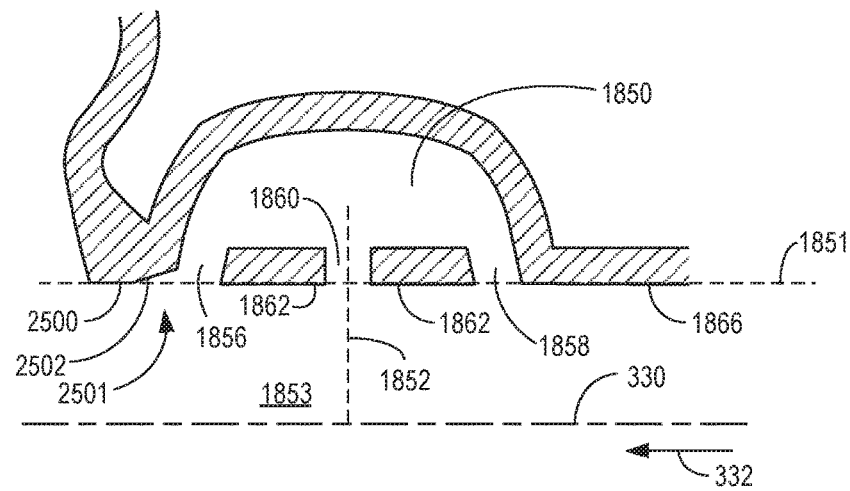
Figure 26:
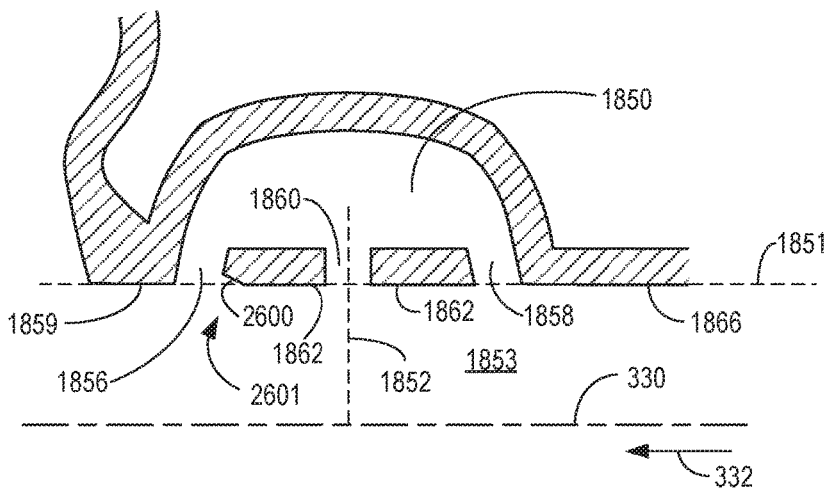

The flow passage may include a flow disrupting feature (which may be referred to herein as an annular flow disrupting feature), as shown by FIGS. 3-16, and may additionally include at least one aperture, as shown by FIGS. 2-26. In one example, a diameter of the flow passage at the flow disrupting feature may be different than a diameter of the flow passage at locations upstream of the flow disrupting feature. A resonance chamber (which may be referred to herein as a ported shroud, an annular chamber, or simply a chamber) surrounds an outer perimeter of the flow passage, and may include one or more apertures, or openings, formed between an inner perimeter of the flow passage and the resonance chamber. In one example, each aperture may be spaced a same distance from each adjacent aperture, as shown by FIG. 17. In another example, one or more apertures may extend in a radial direction relative to a central axis of the flow passage, as shown by FIG. 18. In another example, one or more apertures may extend in an angled direction relative to the central axis, as shown by FIG. 19. In yet another example, one or more apertures may be positioned a first distance from a bleed passage and a second distance from a recirculation passage, with the first distance being a different amount than the second distance, as shown by FIG. 20. In some embodiments, a different flow disrupting feature (which may be referred to herein as an edge break) may be positioned upstream of the apertures, as shown by FIGS. 21-24. In other embodiments, the flow disrupting feature may be positioned downstream of the bleed passage, as shown by FIG. 25, and upstream of a compressor wheel. In yet other embodiments, the flow disrupting feature may be positioned upstream of the bleed passage and downstream of the apertures, as shown by FIG. 26.

Figure 1:
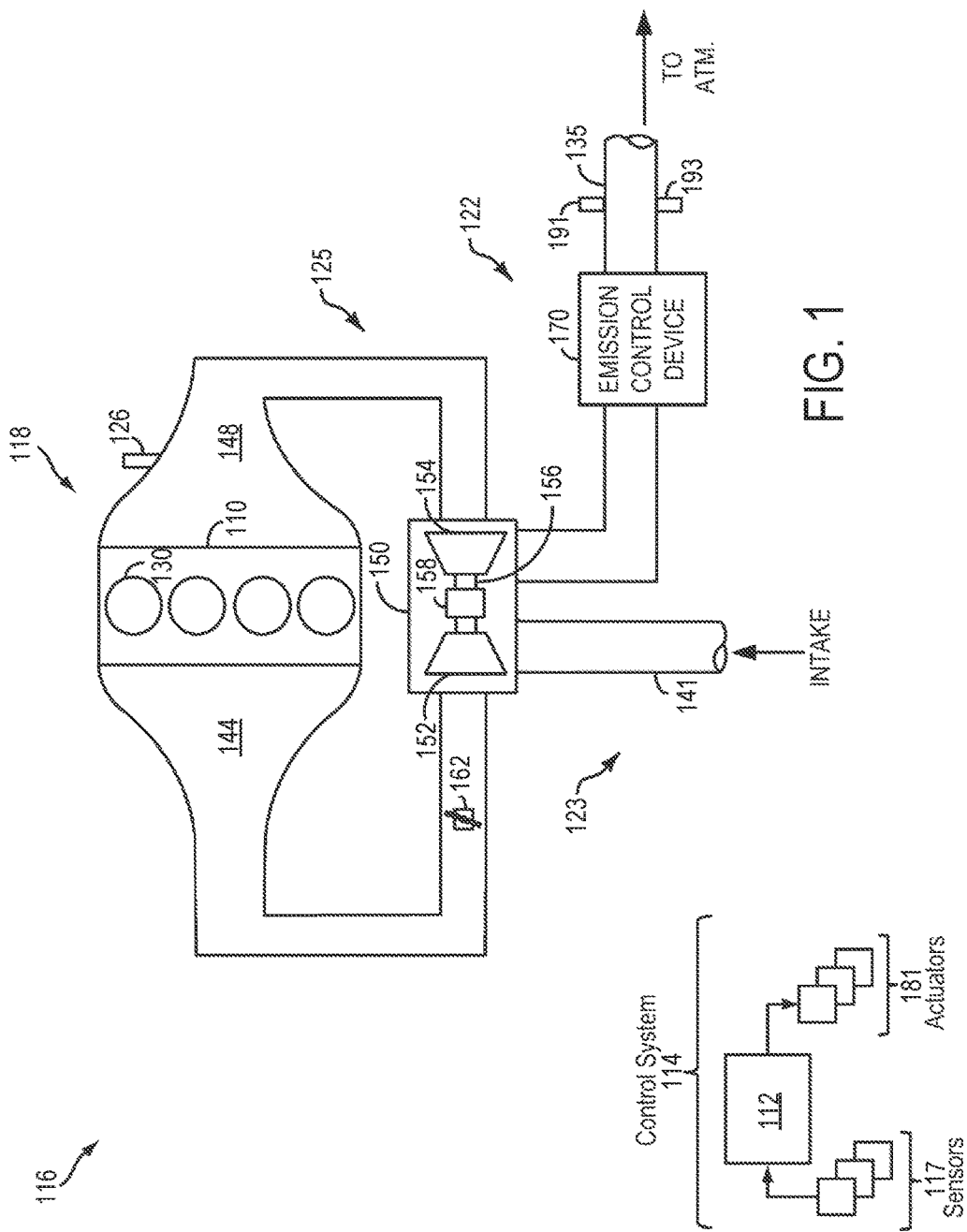
FIG. 1 shows a schematic depiction of an example vehicle system including a turbocharger.

FIG. 1 shows a schematic depiction of a vehicle system 116. The vehicle system 116 includes an engine system 118 coupled to an exhaust after-treatment system 122. The engine system 118 includes an engine 110 having a plurality of cylinders 130. Engine 110 includes an engine intake system 123 and an engine exhaust system 125. Engine intake system 123 includes a throttle 162 fluidly coupled to an intake manifold 144 via an intake passage 141. The engine exhaust system 125 includes an exhaust manifold 148 fluidly coupled to an exhaust passage 135 configured to route exhaust gas to the atmosphere. Throttle 162 may be located in intake passage 141 downstream of a boosting device, such as turbocharger 150, or a supercharger.

Figure 3:
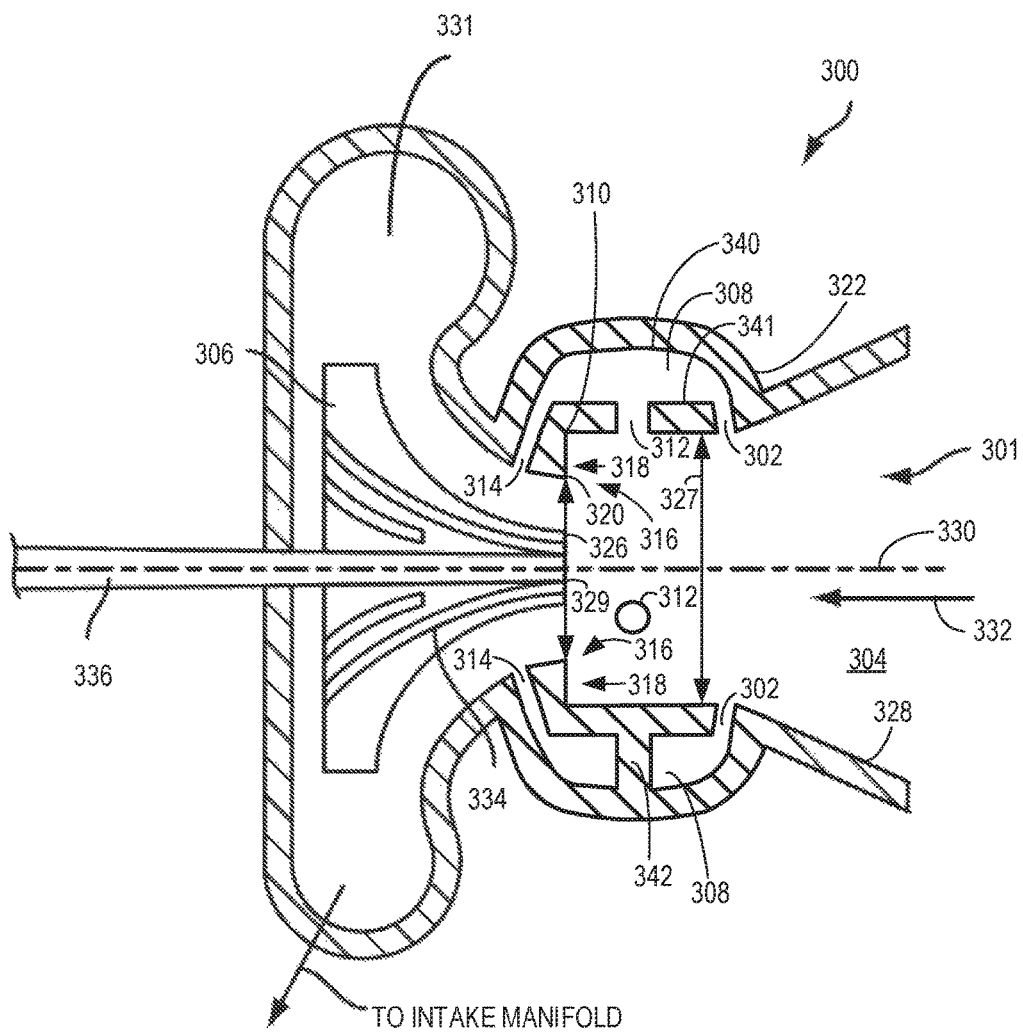
FIG. 3 shows a cross-sectional view of an example compressor including a first embodiment of a flow disrupting feature and a plurality of flow disrupting apertures.

Turbocharger 150 includes a compressor 152 arranged between intake passage 141 and intake manifold 144. In one example, the compressor 152 may be a ported shroud compressor, as shown by FIG. 3 and described in further detail below. Compressor 152 may be at least partially powered by exhaust turbine 154, arranged between exhaust manifold 148 and exhaust passage 135. Compressor 152 may be coupled to exhaust turbine 154 via shaft 156. Compressor 152 may also be at least partially powered by an electric motor 158. In the depicted example, electric motor 158 is shown coupled to shaft 156. However, other suitable configurations of the electric motor may also be possible.

In one example, the electric motor 158 may be operated with stored electrical energy from a system battery (not shown) when an amount of electrical charge stored by the battery is above a threshold amount of charge. By using electric motor 158 to operate turbocharger 150 (for example, at engine start), an electric boost (e-boost) may be provided to the intake air charge. In this way, the electric motor 158 may assist the boosting device (e.g., turbocharger 150) in order to increase an output of the boosting device (e.g., increase an amount of compressed air flowing from compressor 152). While the engine 110 is running, exhaust gas generated by the engine 110 may flow from the exhaust manifold into the exhaust passage 135 and drive exhaust turbine 154. However, if the engine 110 has not been running for a sufficient amount of time (e.g., if a time since starting the engine 110 is less than a threshold amount of time), a flow rate of exhaust gas through the exhaust passage 135 may not be high enough to spin the exhaust turbine 154 to a normal operational speed (e.g., a speed desirable for a steady flow of compressed air from compressor 152). As a result, the electric motor 158 may be energized by the battery in order to spin the exhaust turbine 154 (thereby driving the compressor 152) until the exhaust flow rate has increased above a threshold flow rate. Consequently, as the exhaust flow rate increases, the amount of assistance provided by the electric motor 158 (e.g., an amount and/or duration of energization of the electric motor) may be decreased. That is, during turbocharger operation, the motor-assist provided by the electric motor 158 may be adjusted responsive to the operation of the exhaust turbine.

Engine exhaust system 125 may be coupled to exhaust after-treatment system 122 along exhaust passage 135.

Exhaust after-treatment system 122 may include one or more emission control devices 170, which may be mounted in a close-coupled position in the exhaust passage 135. One or more emission control devices 170 may include a three-way catalyst, lean NOx filter, SCR catalyst, etc. The catalysts may enable toxic combustion by-products generated in the exhaust, such as NOx species, unburned hydrocarbons, carbon monoxide, etc., to be catalytically converted to less-toxic products before expulsion to the atmosphere. However, the catalytic efficiency of the catalyst may be largely affected by the temperature of the exhaust gas. For example, the reduction of NOx species may require higher temperatures than the oxidation of carbon monoxide. Unwanted side reactions may also occur at lower temperatures, such as the production of ammonia and $N_2O$ species, which may adversely affect the efficiency of exhaust treatment, and degrade the quality of exhaust emissions. Thus, catalytic treatment of exhaust may be delayed until the catalyst(s) have attained a light-off temperature. Exhaust after-treatment system 122 may also include hydrocarbon retaining devices, particulate matter retaining devices, and other suitable exhaust after-treatment devices (not shown). It will be appreciated that other components may be included in the engine system 118, such as a variety of valves and sensors. For example, engine system 118 may additionally include a plurality of intake valves, exhaust valves, exhaust and/or intake bypass valves, temperature sensors, flow rate sensors, etc.

The vehicle system 116 may further include control system 114. Control system 114 is shown receiving information from a plurality of sensors 117 (various examples of which are described herein) and sending control signals to a plurality of actuators 181 (various examples of which are described herein). As one example, sensors 117 may include exhaust gas sensor 126 (located in exhaust manifold 148), temperature sensor 191, and pressure sensor 193 (located downstream of emission control devices 170). Other sensors such as pressure, temperature, air/fuel ratio, and composition sensors may be coupled to various locations in the vehicle system 116. Example actuators 181 may include fuel injectors (not shown), a variety of valves, a pump, and throttle 162. The control system 114 may include a controller 112. The controller 112 receives signals from the various sensors of FIG. 1 and employs the various actuators of FIG. 1 to adjust engine operation based on the received signals and instructions stored on a memory of the controller. For example, adjusting an amount of intake air flowing into the engine 110 may include adjusting a position of the throttle 162 to increase or decrease the amount of intake air flowing through the intake manifold 144 towards the engine 110. In another example, adjusting a speed of compressor 152 may include adjusting an actuator of the compressor 152 (e.g., adjusting an amount of electrical energy supplied to electric motor 158) in order to increase or decrease the speed of compressor 152.

Figure 2:
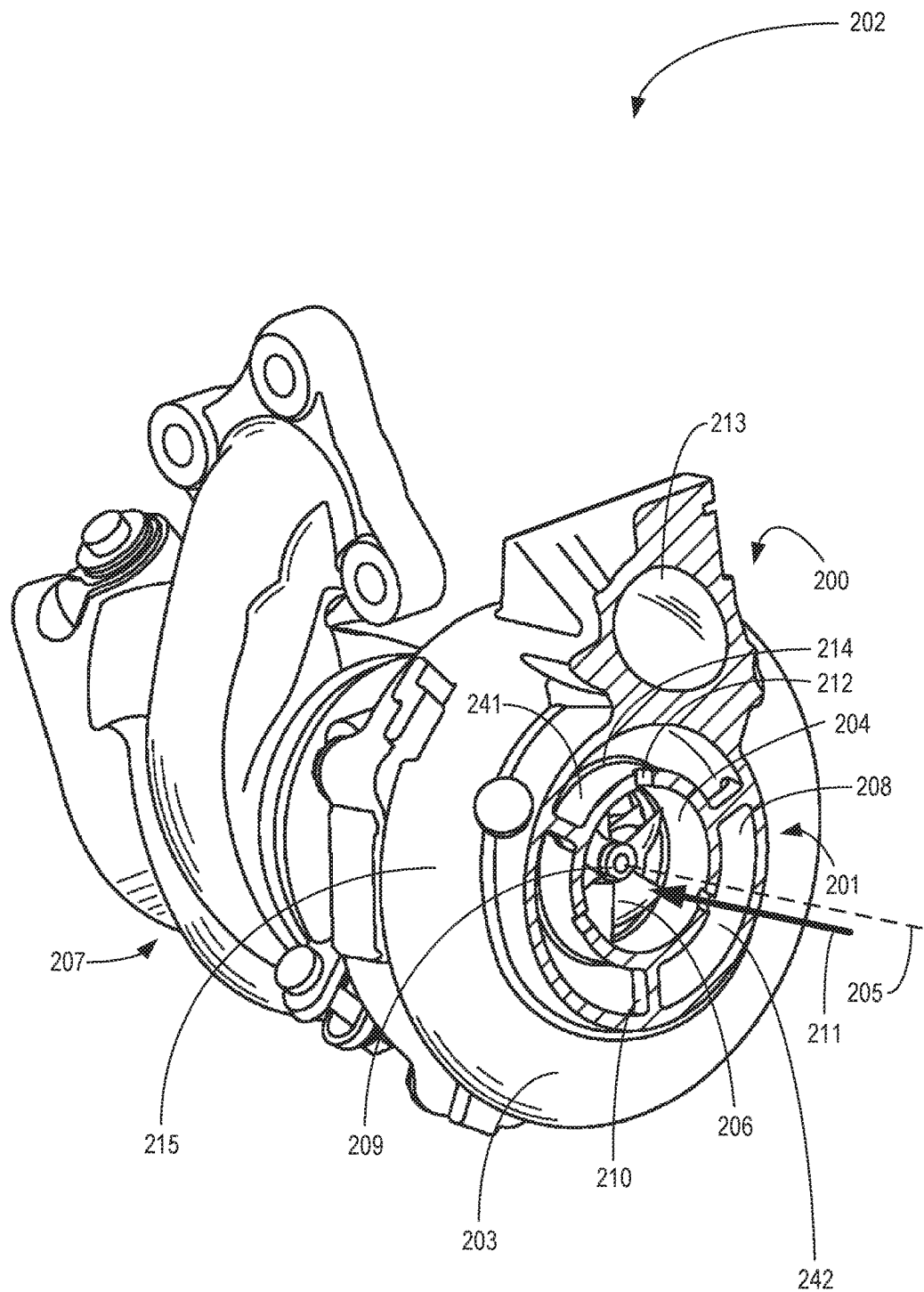
FIG. 2 shows a perspective view of a turbocharger including a compressor, with an inlet of the compressor shown in cross-section.

FIG. 2 shows an example turbocharger 202, similar to the turbocharger 150 shown by FIG. 1, in a perspective view. In one example, the turbocharger 202 shown in FIG. 2 (and the other turbochargers and compressors described herein) may be included in an engine system, such as engine system 118 shown in FIG. 1. The turbocharger 202 shown by FIG. 2 includes a compressor 200, similar to the compressor 152 shown by FIG. 1, with the compressor 200 shown in cross-section. The compressor 200 includes a casing 203, an inlet end 201, a flow passage 204 (which may herein be referred to as a central passage), and an impeller 206, described below.

The flow passage 204 of the compressor 200 is configured to flow air from the inlet end 201 of the compressor 200 to an outlet end 213 positioned downstream of the impeller 206. The flow passage 204 may be coupled to an intake passage (not shown by FIG. 2), such as the intake passage 141 shown by FIG. 1 and described above. The impeller 206 is coupled to exhaust turbine 207 via shaft 209. As exhaust gas flows through the exhaust turbine 207, the impeller 206 may be forced to rotate, as described above with reference to turbocharger 150 of FIG. 1. The rotation of the impeller 206 flows air from the intake passage and through the inlet end 201 of the compressor 200. The intake air 211 flows through the flow passage 204, through the impeller 206, and into volute 215. The compressed intake air may then flow out of the compressor 200 via the outlet end 213.

In the example shown by FIG. 2, the casing 203 of the compressor 200 is a ported shroud casing. In other words, the casing 203 includes a resonance chamber 208 surrounding an outer perimeter of the flow passage 204 and disposed (e.g., formed) between an outer surface 241 of the flow passage 204 and an interior surface 242 of the casing 203. The outer surface 241 of the flow passage 204 and the interior surface 242 of the casing 203 are coupled via a plurality of struts 210 extending from the interior surface 242 to the outer surface 241 in a direction perpendicular to a central axis 205 of the flow passage 204. In the examples described herein, the central axis of the flow passage is also a central axis of the casing and the compressor, and may be referred to as such.

During operation of the compressor 200 (e.g., while intake air is flowing into the inlet end 201 and through the flow passage 204), the rotation of the impeller 206 and the flow of the intake air through the compressor 200 may result in noise. The resonance chamber 208 is included in order to reduce the amount of noise produced by the compressor 200. For example, as intake air flows through the flow passage 204, an acoustic resonance may develop within flow passage 204. By surrounding flow passage 204 with the resonance chamber 208, air may flow from the flow passage 204 into the resonance chamber 208 via a bleed passage 214, thereby reducing the amount of resonance within the flow passage 204. In other words, the bleed passage 214 fluidly couples the flow passage 204 with the resonance chamber 208.

However, although the resonance chamber 208 decreases the amount of sound produced by the compressor 200, noise (e.g., acoustical resonance) may also develop within the resonance chamber 208. In order to reduce an amount of noise produced by the resonance chamber 208, apertures 212 are coupled to the flow passage 204 upstream of the bleed passage 214. Each aperture 212 extends between the flow passage 204 and the resonance chamber 208 in a radial direction relative to central axis 205, and each aperture 212 fluidly couples the flow passage 204 with the resonance chamber 208. In one example, a portion of air flowing through the flow passage 204 may flow into the resonance chamber 208 via the bleed passage 214. The air flowing into the resonance chamber 208 may then flow back into the flow passage 204 via one or more of the apertures 212. By flowing air from the resonance chamber 208 into the flow passage 204, a pressure of air within the resonance chamber 208 and a noise produced by the resonance chamber 208 may be reduced. Flowing air from the flow passage 204 into the resonance chamber 208 via the bleed passage 214 may reduce the amount of noise produced by the compressor 200 by a first amount, while flowing air from the resonance chamber 208 back into the flow passage 204 via one or more of the apertures 212 may reduce the noise produced by the compressor 200 by a second amount.

FIGS. 2-17 show various embodiments of compressors or portions of compressors, with each embodiment including a plurality of apertures configured to allow fluidic communication between a resonance chamber surrounding the flow passage and the flow passage. In some examples, a compressor may also include a flow disrupting feature positioned within the flow passage. In one example, the flow disrupting feature may include a step, with an angle of the step relative to the central axis being between 10 and 170 degrees. In other examples, the step may have a different configuration and may be formed by multiple surfaces. Examples of the step, flow disrupting feature, and apertures are described below. In alternate embodiments, the compressors shown in FIGS. 2-17 may not include a flow disrupting feature and may instead include a relatively straight flow passage with apertures arranged between the flow passage and the resonance chamber.

FIG. 3 shows a cross-sectional view of an example compressor 300, similar to the compressor 152 shown by FIG. 1 or the compressor 200 shown by FIG. 2 and described above. The compressor 300 includes a casing 322 having an inlet end 301 and an outlet end 331. A flow passage 304 within the casing 322 is configured to pass an incoming flow of inlet air 332 from the inlet end 301 to the outlet end 331 and may have a substantially continuous inner surface 328 (which may be referred to herein as an interior surface). A central axis 330 of the flow passage 304 is shown, with the central axis 330 extending through a center of the flow passage 304. A compressor wheel 306 is located within the casing 322 and includes at least one main blade 334. The compressor wheel 306 is coupled to shaft 336 and is configured to rotate within the casing 322 to compress the inlet air. The casing 322 may include a flow disrupting feature 316 configured to disrupt the continuity of the inner surface 328. In the example shown by FIG. 3, the flow disrupting feature 316 is located at a leading edge 326 of the at least one main blade 334. In other words, the flow disrupting feature 316 is axially in-line with the leading edge 326 relative to the central axis 330.

Figure 4:
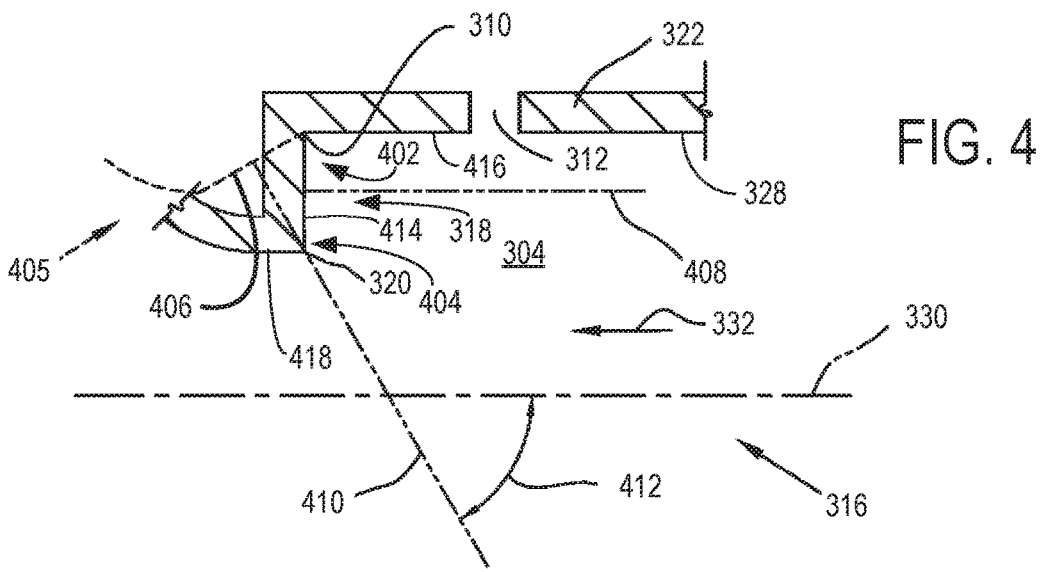
FIG. 4 shows an enlarged view of a second embodiment of a flow disrupting feature and a flow disrupting aperture.

The flow passage 304 may be substantially circular in cross section and the flow disrupting feature 316 may be a step 318 wherein the flow passage 304 abruptly decreases in diameter (e.g., decreases from first diameter 327 to second diameter 329). In the example shown by FIG. 3, the step 318 is a portion of the inner surface 328 that extends in a direction toward the central axis 330. An enlarged view of the step 318 is shown by FIG. 4 and described below. By forming the flow disrupting feature 316 as the step 318, a cross-sectional area of the flow passage 304 may be reduced. For example, when the flow passage 304 has a cylindrical shape (e.g., a circular cross-section) as shown by FIG. 3, the step 318 reduces a flow diameter of the flow passage 304 which may reduce the axial inlet flow and may also, or instead, increase a surge margin of the compressor (e.g., reduce a likelihood of compressor surge during operation of the compressor 300), and reduce whoosh (e.g., reduce an amount of noise produced by the compressor 300).

The casing 322 of the compressor 300 is a ported shroud casing, similar to the casing 203 shown by FIG. 2 and described above. The compressor 300 includes a resonance chamber 308 formed by the casing 322 and surrounding the flow passage 304. In other words, as described above with reference the resonance chamber 208 shown by FIG. 2, the resonance chamber 308 shown by FIG. 3 is formed between an outer surface 341 of the flow passage 304 and an interior surface 340 of the casing 322. In this way, the resonance chamber circumferentially surrounds (e.g., surrounds around its entire circumference) the flow passage 304. A strut 342, similar to the strut 210 shown by FIG. 2, couples the outer surface 341 to the interior surface 340. The resonance chamber 308 is fluidly coupled with the flow passage 304 via a bleed passage 314, a recirculation passage 302, and a plurality of apertures 312. In one example, the bleed passage 314 and the recirculation passage 302 are annular passages formed by the inner surface 328 of the flow passage 304, and are disposed between the flow passage 304 and the resonance chamber 308 (e.g., extending between the inner surface 328 and the outer surface 341 of the flow passage 304 in a radial direction relative to the central axis 330) in order to fluidly couple the flow passage 304 with the resonance chamber 308. In other words, the bleed passage 314 and recirculation passage 302 are formed by the inner surface 328 and extend along an inner perimeter of the flow passage 304. The bleed passage 314 is positioned downstream of the recirculation passage 302 relative to a flow of air through the flow passage 304. In one example, the bleed passage 314 is positioned downstream of the leading edge 326 of the at least one main blade 334, and the recirculation passage 302 is positioned upstream of the leading edge 326. The bleed passage 314 is positioned such that a portion of air flowing from the at least one main blade 334 as the compressor wheel 306 rotates may flow through the bleed passage 314 and into the resonance chamber 308. The air may then flow through the resonance chamber 308 and return to the flow passage 304 via the recirculation passage 302 and/or the apertures 312, with an amount of air flowing from the resonance chamber 308 to the flow passage 304 via the recirculation passage 302 being greater than an amount of air flowing from the resonance chamber 308 to the flow passage 304 via the apertures 312 due to a reduced size of the apertures 312 relative to the recirculation passage 302, as described below.

In contrast to the bleed passage 314 and the recirculation passage 302, the apertures 312 are not annular passages. Instead, in one example, each aperture 312 may extend between the flow passage 304 and the resonance chamber 308 in a radial direction relative to the central axis 330 in order to fluidly couple the flow passage 304 with the resonance chamber 308. However, the apertures 312 do not form an annular opening around the inner perimeter of the flow passage 304. Instead, each aperture 312 may have an elliptical or circular cross-section, with each aperture 312 positioned away from each other aperture 312, such that each aperture 312 forms a cylindrical passage between the flow passage 304 and the resonance chamber 308. In one example, each aperture 312 may extend between the flow passage 304 and the resonance chamber 308 in a radial direction relative to the central axis 330 (e.g., as shown by FIG. 18). In another example, each aperture 312 may extend between the flow passage 304 and the resonance chamber 308 in an angled direction relative to the central axis 330 (e.g., as shown by FIG. 19). For example, the compressor 300 includes three distinct apertures 312 in an arrangement similar to the apertures 212 shown by FIG. 2, with two of the apertures 312 visible in the cross-sectional view shown by FIG. 3. Each aperture 312 extends from the inner surface 328 of the flow passage 304 to the outer surface 341 of the flow passage 304. In this way, fluid (e.g., air) may flow between the flow passage 304 and the resonance chamber 308 via each of the apertures 312, such that the flow passage 304 is in fluidic communication with the resonance chamber 308 via the apertures 312. Additionally, fluid may flow between the flow passage 304 and the resonance chamber 308 via both of the bleed passage 314 and the recirculation passage 302. However, although the flow passage 304 is in fluidic communication with the resonance chamber 308 via the recirculation passage 302, an amount of air flowing into the flow passage 304 via the recirculation passage 302 is much smaller than an amount of air flowing into the flow passage 304 via the inlet end 301. Additionally, although the flow passage 304 is additionally in fluidic communication with the resonance chamber 308 via the apertures 312, an amount of air flowing into the flow passage 304 via the apertures 312 is smaller than the amount of air flowing into the flow passage 304 via the recirculation passage 302. In this way, the apertures 312 may reduce an air pressure within the resonance chamber 308.

In an example of fluid flow through the flow passage 304, air may enter the inlet end 301 of the compressor 300 and flow through the flow passage 304 toward the compressor wheel 306. As the air flows toward the leading edge 326 of the at least one main blade 334, a portion of the air may flow against the flow disrupting feature 316 (e.g., against the step 318), thereby disrupting a flow path of the air through the flow passage 304. By disrupting the flow path of the air through the flow passage 304 with the flow disrupting feature 316, a damping of a resonant frequency of the flow passage 304 may be increased, thereby decreasing an amplitude of noise produced by the compressor 300. At some flow conditions, airflow from the at least one main blade 334 may backflow against the incoming flow of inlet air 332. The flow disrupting feature 316 may increase an expansion of the backflowing air into the flow passage 304 in order to mix the backflowing air with the incoming flow of inlet air 332.

As the air flows past the leading edge 326 of the at least one main blade 334 in the direction of the outlet end 331, a portion of the air may flow through the bleed passage 314 into the resonance chamber 308. Air flowing into the resonance chamber 308 via the bleed passage 314 may be recirculated back into the flow passage 304 via recirculation passage 302. By flowing a portion of air from the flow passage 304 into the resonance chamber 308, an amount of noise resulting from a blade pass frequency of the compressor wheel 306 may be reduced. However, as air flows through the resonance chamber 308, a pressure of air within the resonance chamber may result in an undesirable noise. In order to reduce an amount of air pressure within the resonance chamber 308 and disrupt the flow path of air through the resonance chamber 308, the apertures 312 are included to provide an additional flow path of air from the resonance chamber 308 to the flow passage 304. In this way, a first portion of air flowing through the resonance chamber 308 may flow out of the resonance chamber 308 through the recirculation passage 302 and back into the flow passage 304, while a second portion of air (with the second portion being a lesser amount than the first portion) may flow out of the resonance chamber 308 through one or more of the apertures 312, thereby reducing an amount of air pressure within the resonance chamber 308. As a result of the position and size of the apertures 312, an amplitude of noise produced by the resonance chamber 308 is reduced.

FIG. 4 shows an enlarged view of the flow disrupting feature 316 shown by FIG. 3, with a second example step 405 of the flow disrupting feature 316 illustrated with dashed lines. As described above with reference to FIG. 3, the flow disrupting feature 316 includes the step 318 which may be substantially annular in the case of a substantially cylindrical casing 322. The step 318 is formed by a first portion 416 of the inner surface 328 of the flow passage 304 (shown by FIG. 3), a first step surface 414, and a second portion 418 of the inner surface 328. The first portion 416 and second portion 418 of the inner surface 328 may each extend in a direction parallel with the central axis 330 of the flow passage 304, while the first step surface 414 extends between (and is joined with) the first portion 416 and second portion 418 in a direction perpendicular to the central axis 330.

In this configuration, the inner corner 310 of the step 318 is defined as a junction between the first portion 416 and the first step surface 414, while the outer corner 320 is defined as a junction between the first step surface 414 and the second portion 418. As a result, the inner corner 310 is positioned along the first diameter 327 (shown by FIG. 3) while the outer corner 320 is positioned along the second diameter 329 (shown by FIG. 3). The inner corner 310 may define, or be included in an upstream transitional portion 402 of the step 318, and the outer corner 320 may define, or be included in, a downstream transitional portion 404 of the step 318. An example of a second step 405 is illustrated in dashed line angled relative to the step 318. The aperture 312 is shown positioned upstream of the step 318 (and second step 405) along the flow passage 304, relative to the incoming flow of inlet air 332 toward the at least one main blade 334 (shown by FIG. 3)

A first axis 408 and a second axis 410 are shown, with the first axis 408 arranged perpendicular to the step 318, and the second axis 410 arranged perpendicular to a second step surface 406 (e.g., a surface of the second step 405, indicated by a dashed line). Within some example embodiments, an axis perpendicular with a surface of the step (e.g., first axis 408 perpendicular to the first step surface 414) may be parallel with the central axis 330 of the casing 322 (e.g., a centerline of the casing 322), or general direction of the flow passage 304. Within other example embodiments such as with the second step 405, an axis perpendicular with a surface of the step (e.g., the second axis 410 perpendicular with the second step surface 406) may be angled by an angle 412 relative to the central axis 330 of the casing 322. Accordingly, in some cases (such as in the example of the second step 405) the step may be arranged at an angle with an incoming flow of inlet air 332. The angle 412 may be, for example, between 0 and 80 degrees. In some cases the angle 412 may be approximately 45 degrees, or negative. In various other examples the flow disrupting feature may include an upstream transitional portion 402 and/or a downstream transitional portion 404 shaped in various ways, as shown by FIGS. 5-14, and described below.

FIGS. 5-9 each show examples of alternate embodiments of flow disrupting features similar to the flow disrupting feature 316 shown by FIGS. 3-4 and described above. For example, the alternate embodiments shown by FIGS. 5-9 may be included within a compressor, such as the compressor 200 shown by FIG. 2 or the compressor 300 shown by FIG. 3, in lieu of the flow disrupting feature 316. Each of the embodiments shown by FIGS. 5-9 include the apertures 312, with the apertures 312 shown in a similar position throughout each example. In other examples, the apertures 312 may be positioned differently and/or a different number of apertures 312 may be included. For example, in some embodiments, the apertures 312 may be positioned at an increased or decreased amount of distance from a corresponding step (e.g., step 318) of a flow disrupting feature (e.g., flow disrupting feature 316) in a direction parallel to the central axis 330, with each aperture 312 fluidly coupled with a resonance chamber (e.g., the resonance chamber 208 shown surrounding flow passage 204 by FIG. 2, or the resonance chamber 308 shown surrounding flow passage 304 by FIG. 3). In other embodiments, a different number of apertures 312 may be included, such as two, four, five, etc. In still other embodiments, the apertures 312 may not be included with the flow disrupting feature. Although FIGS. 4-8, FIGS. 10-14, and FIG. 17 each do not show a resonance chamber, a respective resonance chamber of each embodiment may be positioned within each embodiment similar to the positioning of resonance chamber 208 around flow passage 204 (shown by FIG. 2), resonance chamber 308 positioned around flow passage 304 (shown by FIG. 3), etc.

Figure 5:
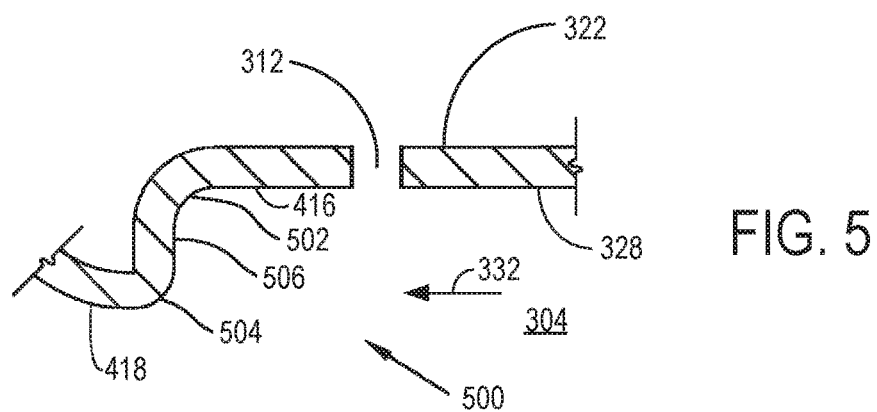
FIG. 5 shows an enlarged view of a third embodiment of a flow disrupting feature and a flow disrupting aperture.

FIG. 5 is an enlarged view (e.g., similar to the view shown by FIG. 4) of another example of a flow disrupting feature, with the flow disrupting feature 500 included within a compressor such as compressor 200 shown by FIG. 2 or compressor 300 shown by FIG. 3. The flow disrupting feature 500 shown by FIG. 5 includes a step 506 positioned perpendicular to the incoming flow of inlet air 332, similar to the step 318 shown by FIGS. 3-4 and described above. However, while the flow disrupting feature 500 shown by FIG. 5 has similarities to the flow disrupting feature 316 shown by FIGS. 3-4, an upstream transitional portion 502 and a downstream transitional portion 504 of the flow disrupting feature 500 each have filleted (e.g., rounded) corners in contrast to the outer corner 320 and inner corner 310 shown by FIGS. 3-4 and described above.

Figure 6:
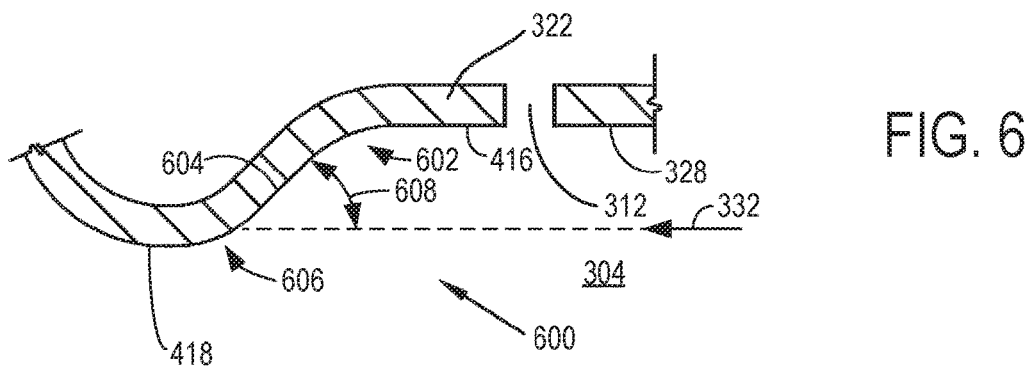
FIG. 6 shows an enlarged view of a fourth embodiment of a flow disrupting feature and a flow disrupting aperture.

FIG. 6 shows another example flow disrupting feature 600 similar to the flow disrupting feature 316 shown by FIGS. 3-4 and the flow disrupting feature 500 shown by FIG. 5. In contrast to the flow disrupting feature 316 and the flow disrupting feature 500, the flow disrupting feature 600 includes a step 604 positioned at an angle 608 relative to the incoming flow of inlet air 332. In one example, the angle 608 may be an angle between zero and ninety degrees such that the step 604 is not positioned perpendicular with the incoming flow of inlet air 332, and the step 604 is additionally not positioned parallel with the incoming flow of inlet air 332. In the example shown by FIG. 6, the step 604 is angled between an upstream transitional portion 602 and a downstream transitional portion 606 of the flow disrupting feature 600. In this example, the upstream and downstream transitional portions each include curved surfaces joined with the step 604. The step 604, the upstream transitional portion 602, and the downstream transitional portion 606 may together form a continuously curved surface. In this way, the step 604 may be oriented at an angle relative to the direction of the incoming flow 332.

Figure 7:
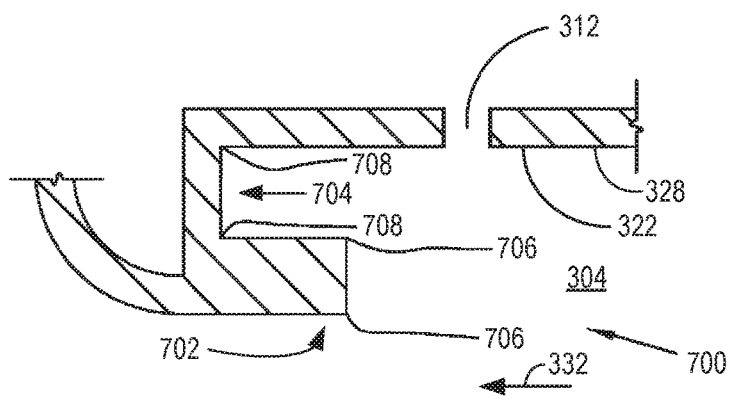
FIG. 7 shows an enlarged view of a fifth embodiment of a flow disrupting feature and a flow disrupting aperture.
Figure 8:
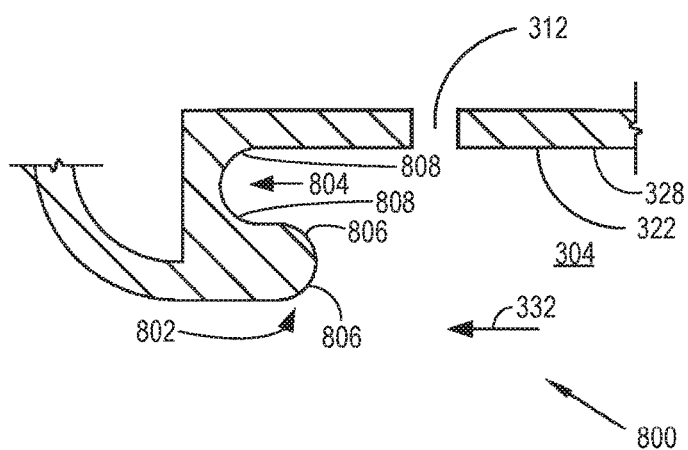
FIG. 8 shows an enlarged view of a sixth embodiment of a flow disrupting feature and a flow disrupting aperture.

In some embodiments of the flow disrupting feature, such as the embodiments shown by FIGS. 7-8, an upstream transitional portion and a downstream transitional portion of the flow disrupting feature may include portions that reverse direction. In other words, portions of the flow disrupting feature may begin to extend downstream (e.g., relative to the incoming flow of inlet air) and then extend upstream at least for a short distance. Examples are described below with reference to FIGS. 7-8.

FIG. 7 shows another example of a flow disrupting feature included within a compressor, such as compressor 200 or compressor 300 shown by FIG. 2 and FIGS. 3-4 respectively. The flow disrupting feature 700 shown by FIG. 7 includes a protruded element 702 and a recessed element 704. In one example, the protruded element 702 extends in a direction opposite to the incoming flow of inlet air 332, while the recessed element 704 extends in a same direction as the incoming flow of inlet air 332. The protruded element 702 includes external corners 706 and the recessed element includes internal corners 708. In some cases, one or more of the external corners 706 and internal corners 708 may be square (e.g., right angle) corners as shown by FIG. 7. In other examples (such as the example shown by FIG. 8 and described below), one or more of the external corners 706 and internal corners 708 may be filleted (e.g., rounded).

FIG. 8 shows another example of a flow disrupting feature. In this example, flow disrupting feature 800 includes a protruded element 802 and a recessed element 804. In alternate examples, the flow disrupting feature 800 may include a plurality of protruded elements 802 and/or recessed elements 804. Similar to the example shown by FIG. 7 and described above, the protruded element 802 extends in a direction opposite to the incoming flow of inlet air 332, and the recessed element 804 extends in a same direction as the incoming flow of inlet air 332. However, in the example of the flow disrupting feature 800 shown by FIG. 8, the surfaces of the protruded element 802 and the recessed element 804 transition smoothly from (e.g., form continuously curved surfaces with) adjacent surfaces. For example, in contrast with the external corners 706 of the protruded element 702 and the internal corners 708 of the recessed element 704 shown by FIG. 7, the protruded element 802 and the recessed element 804 shown by FIG. 8 include rounded external corners 806 and rounded internal corners 808. With some examples the protruded element and the recessed element may be substantially cylindrical elements, and may be toroid shaped.

Figure 9:
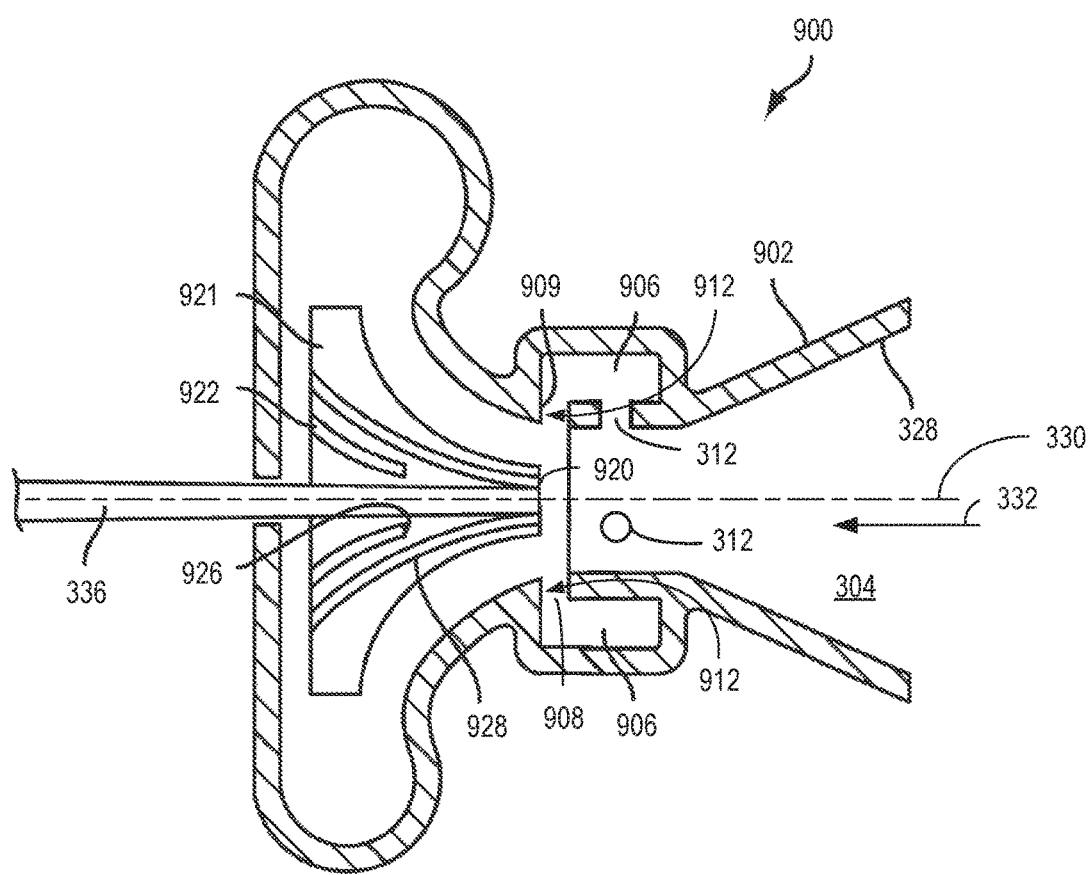
FIG. 9 shows a cross-sectional view of a compressor including a seventh embodiment of a flow disrupting feature and a plurality of flow disrupting apertures.

FIG. 9 is a cross-sectional view of another example compressor, similar to the compressor 200 shown by FIG. 2 and the compressor 300 shown by FIGS. 3-4. The compressor 900 includes compressor wheel 921 located in a casing 902. The compressor wheel 921 is configured to rotate within the casing 902 to compress the incoming flow of inlet air 332. The flow passage 304 is located within the casing 902 and configured to pass inlet air, and includes substantially continuous inner surface 328. The compressor 900 may also have a flow disrupting feature 912 located at a leading edge 920 of main blades 928 and configured to disrupt a continuity of the inner surface 328.

The compressor wheel 921 may also have splitter blades 922 and/or other features. Each splitter blade 922 may have a leading edge 926 that may be downstream relative to the leading edge 920 of the main blades 928. In various embodiments (such as that shown by FIG. 9), the flow disrupting feature 912 may include a step 909 positioned perpendicular relative to the central axis 330 of the compressor 900. The flow disrupting feature 912 is fluidly coupled with a resonance chamber 906, with an opening 908 of the resonance chamber 906 formed between the step 909 of the flow disrupting feature 912 and the inner surface 328. The resonance chamber 906 may be sized and shaped to reduce a whoosh noise generated by the compressor wheel 921, and may be additionally fluidly coupled with the flow passage 304 via apertures 312. In one example similar to the embodiments shown by FIGS. 2-4, three apertures 312 are positioned along the inner surface 328 and around central axis 330 (e.g., along an inner perimeter of the flow passage 304). Alternate embodiments may include a different number and/or positioning of the apertures 312. The apertures 312 may additionally reduce an amount of noise produced by the compressor 900 by further disrupting a flow of air through the flow passage 304 and resonance chamber 906.

The description "at a leading edge of the main blades" may refer to a preselected maximum distance at which the flow disrupting feature may be located from the leading edge of the main blade, or blades. The preselected maximum distance may be measured in absolute units, or measured relative to a reference distance between other points of the turbocharger arrangement described herein. An example reference distance may be the longitudinal distance from the leading edge to a trailing edge of the main blade.

In some examples, the step 909 of the flow disrupting feature 912 may be located substantially in line in a flow direction with the leading edge 920 at least one main blade 928. In other words, in some examples, air may flow from the at least one main blade and into the opening 908 formed by the flow disrupting feature 912. In some examples, a majority of the flow disrupting feature 912 may be located upstream from the leading edge 920 of the main blades 928. The step 909 of the flow disrupting feature 912 may be located a distance from the leading edge 920 of the main blades 928 in a direction parallel with the central axis 330 and away from the main blades 928. In some cases, at least a portion of the flow disrupting feature 912 may be located upstream from the leading edge of the main blades 928. In some examples, the step 909 of the flow disrupting feature 912 is located substantially in line with the leading edge 920 of the compressor main blades 928 in a radial direction relative to the central axis 330.

The opening 908 formed by the flow disrupting feature 912 in the inner surface 328 of the flow passage is an annular opening extending along an inner perimeter of the flow passage 304, with the opening 908 being fluidly coupled with the resonance chamber 906. In one example, the resonance chamber 906 is open to the flow passage 304 only via the opening 908 and the apertures 312. The phrase "the resonance chamber is open to the flow passage only via the opening and the apertures" may be interpreted to mean that the resonance chamber is bounded (e.g., closed) everywhere except at the opening 908 and the apertures 312 wherein it is open to the flow passage.

In some examples, the opening 908 and resonance chamber 906 are formed as a single piece, and may be formed (for example) as a molded piece. In other examples, the opening 908 and chamber may be formed by two or more pieces of the casing 902. In yet other examples, the opening 908 may be cut into the flow passage 304 formed, for example, as a tube, or conduit, or the like, and the resonance chamber 906 may be an additional volume (e.g., an additional closed piece) coupled to an exterior of the flow passage 304, with the fluid exchange occurring between the flow passage 304 and the resonance chamber 906 via the opening 908 and apertures 312.

FIGS. 10-14 illustrate various example embodiments of flow disrupting features that may be included within a compressor, such as the compressor 200, compressor 300, or compressor 900 described above. Each of the embodiments shown by FIGS. 10-14 additionally include apertures 312, as described above with reference to FIGS. 2-9. The apertures 312 may provide an alternate flow path for air flowing through the flow passage (e.g., flow passage 304 shown by FIGS. 3-4).

Figure 10:
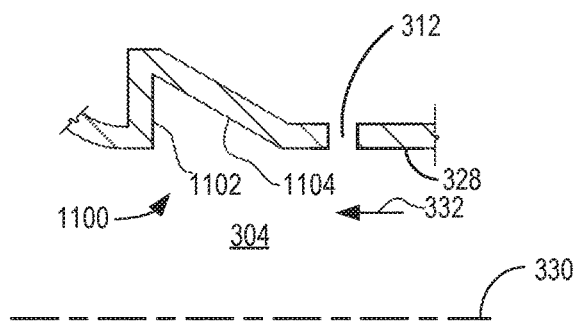
FIG. 10 shows an enlarged view of a seventh embodiment of a flow disrupting feature and flow disrupting aperture.

Flow disrupting feature 1100 shown by FIG. 10 includes a leading edge surface 1104 that splays radially outwardly in a direction away from the central axis 330 of the compressor. The flow disrupting feature 1100 may also include a trailing edge step face 1102 which may abruptly reduce a cross section of the flow passage. The leading edge surface 1104 may be contiguous with a step face 1102 of the flow disrupting feature 1100. In some cases the leading edge surface 1104 may form an acute angle upstream from, or leading up to the step face 1102.

Figure 11:
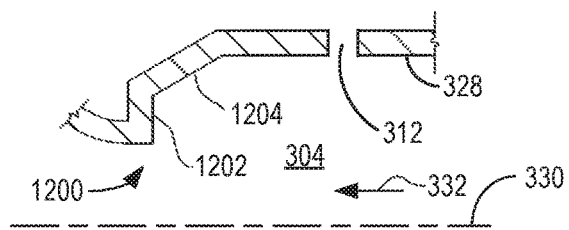
FIG. 11 shows an enlarged view of an eighth embodiment of a flow disrupting feature and flow disrupting aperture.

Flow disrupting feature 1200 shown by FIG. 11 includes a leading edge surface 1204 that splays radially inwardly in a direction toward the central axis 330 of the compressor. The flow disrupting feature 1200 may also include a trailing edge step face 1202 which may abruptly reduce a cross section of the flow passage. The leading edge surface 1204 may be contiguous with the step face 1202 of the flow disrupting feature 1200. In some cases the leading edge surface 1204 may form an obtuse angle upstream from, or leading up to the step face 1202.

Figure 12:
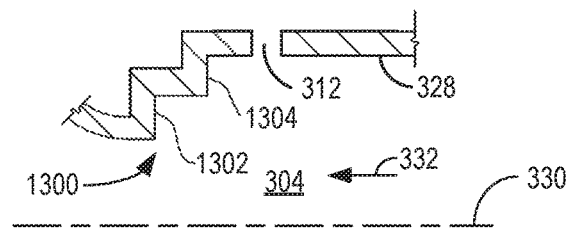
FIG. 12 shows an enlarged view of a ninth embodiment of a flow disrupting feature and flow disrupting aperture.

Flow disrupting feature 1300 shown by FIG. 12 includes a leading edge surface 1304 that extends radially inwardly in a direction toward the central axis 330 of the compressor. The flow disrupting feature 1300 may also include a trailing edge step face 1302 which may abruptly reduce a cross section of the flow passage. The leading edge surface 1304 may be spaced apart from the step face 1302 of the flow disrupting feature 1300. In some cases, the leading edge surface 1304 may form a right angle upstream from, or leading up to the step face 1302.

Figure 13:
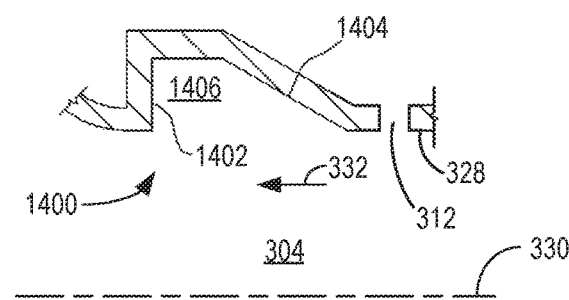
FIG. 13 shows an enlarged view of a tenth embodiment of a flow disrupting feature and flow disrupting aperture.

Flow disrupting feature 1400 shown by FIG. 13 includes a leading edge surface 1404 spaced apart from a step face 1402. The leading edge surface 1404 may form an upstream side of an annular channel 1406, and the step face 1402 may form a downstream edge of the annular channel 1406.

Figure 14:
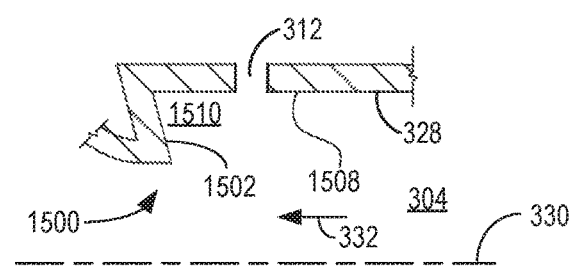
FIG. 14 shows an enlarged view of an eleventh embodiment of a flow disrupting feature and flow disrupting aperture.

Flow disrupting feature 1500 shown by FIG. 14 includes a leading edge surface 1508 spaced apart from a step face 1502. The leading edge surface 1508 may form an upstream side of an annular channel 1510, and the step face 1502 may form a downstream edge of the annular channel 1510. In some cases, the leading edge surface 1508 may form a negative angle upstream from, or leading up to the step face 1502.

Figure 15:
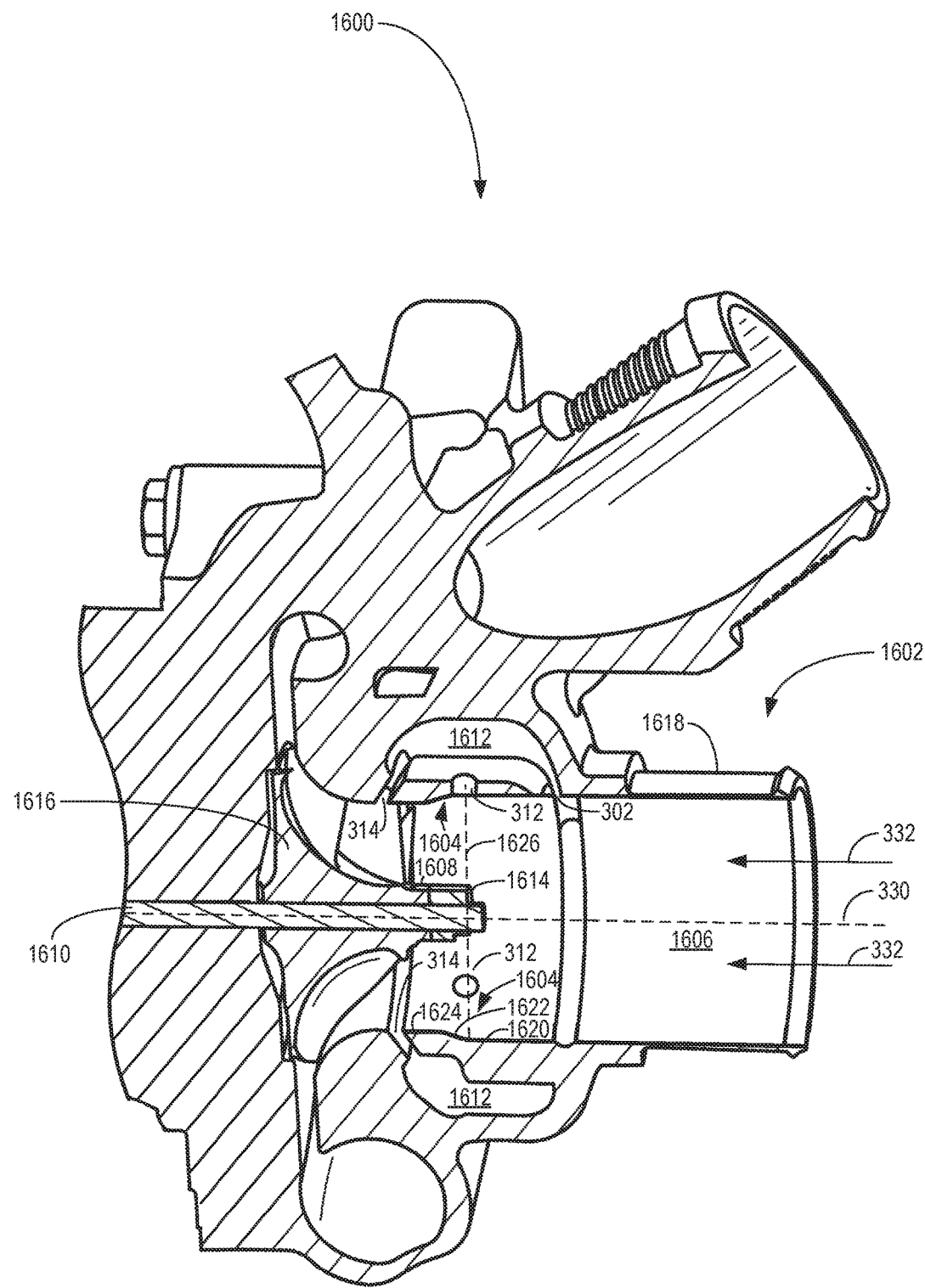
FIG. 15 shows a cross-sectional view of a compressor including a twelfth embodiment of a flow disrupting feature and a plurality of flow disrupting apertures.

FIG. 15 shows a cross-sectional view of another example compressor, similar to the compressors shown by FIGS. 2-3 and FIG. 9. The compressor 1600 shown by FIG. 15 includes a casing 1618, an inlet end 1602, and a flow passage 1606. In one example, the casing 1618, inlet end 1602, and flow passage 1606 may be similar to the casing 203, inlet end 201, and flow passage 204 shown by FIG. 2 and described above. The compressor 1600 additionally includes a compressor wheel 1616 coupled to a shaft 1610 and configured to rotate within the casing 1618, with the compressor wheel 1616 including at least one main blade 1608 with a leading edge 1614.

The flow passage 1606 is fluidly coupled with a resonance chamber 1612 by bleed passage 314, apertures 312, and recirculation passage 302, similar to the examples shown by FIGS. 2-3 and described above. As described above with reference to the embodiment shown by FIG. 3, the bleed passage 314 is positioned downstream of the leading edge 1614 of the at least one main blade 1608 relative to the incoming flow of inlet air 332, and the recirculation passage 302 is positioned upstream of the leading edge 1614, with the apertures 312 positioned between the bleed passage 314 and the recirculation passage 302 (e.g., downstream of recirculation passage 302 and upstream of bleed passage 314). As the compressor wheel 1616 rotates, air may pushed by the at least one main blade 1608 into the resonance chamber 1612 via bleed passage 314. A first portion of the air may flow through the resonance chamber 1612 and back to the flow passage 1606 via the recirculation passage 302, while a second portion of the air may flow through the resonance chamber 1612 and back to the flow passage 1606 via the apertures 312, with the first portion being greater than the second portion.

The flow passage 1606 includes a flow disrupting feature 1604 positioned downstream of apertures 312 and downstream of the leading edge 1614 of the main blade 1608. In other words, the flow disrupting feature 1604 is positioned downstream (relative to incoming flow of inlet air 332) of an axis 1626, with the axis 1626 positioned along the leading edge 1614 and extending in a radial direction relative to the central axis 330. In alternate embodiments, the flow disrupting feature 1604 may be positioned at least partially in-line with axis 1626 such that the axis 1626 intersects the flow disrupting feature 1604. In other embodiments, the flow disrupting feature 1604 may be positioned upstream of the axis 1626 (e.g., upstream of leading edge 1614). However, in each of the example embodiments described above, the bleed passage 314 is positioned downstream of the apertures 312, the apertures 312 are positioned downstream of the recirculation passage 302, and the flow disrupting feature is positioned between the bleed passage 314 and the apertures 312. In this way, air flowing out of resonance chamber 1612 via the apertures 312 may be further disrupted by the flow disrupting feature 1604 positioned downstream of apertures 312, thereby reducing an amount of noise produced by the air flowing through the compressor.

The flow disrupting feature includes a first surface 1620, a second surface 1622, and a third surface 1624, with the first surface 1620 and the third surface 1624 positioned approximately parallel with the central axis 330. In the example shown by FIG. 15, the flow passage 1606 is cylindrical in shape and the third surface 1624 is offset from the first surface 1620 in a direction toward with the central axis 330. As a result, a diameter of the flow passage 1606 defined by the third surface 1624 is decreased relative to a diameter of the flow passage 1606 defined by the first surface 1620. The second surface 1622 is angled relative to the first surface 1620 and third surface 1624 and joins the first surface 1620 to the third surface 1624. In one example, the second surface 1622 may extend between the first surface 1620 and the third surface 1624 without curvature (e.g., may extend directly from an edge of the first surface 1620 to an edge of the third surface 1624 without curving). In another example, the second surface 1622 may curve smoothly and continuously between the first surface 1620 and the third surface 1624 such that the first surface 1620, second surface 1622, and third surface 1624 together form a smooth surface without hard and/or abrupt edges or angles, with the diameter of the flow passage 1606 at a location along the first surface 1620 being greater than a diameter of the flow passage 1606 at a location along the third surface 1624.

Figure 16:
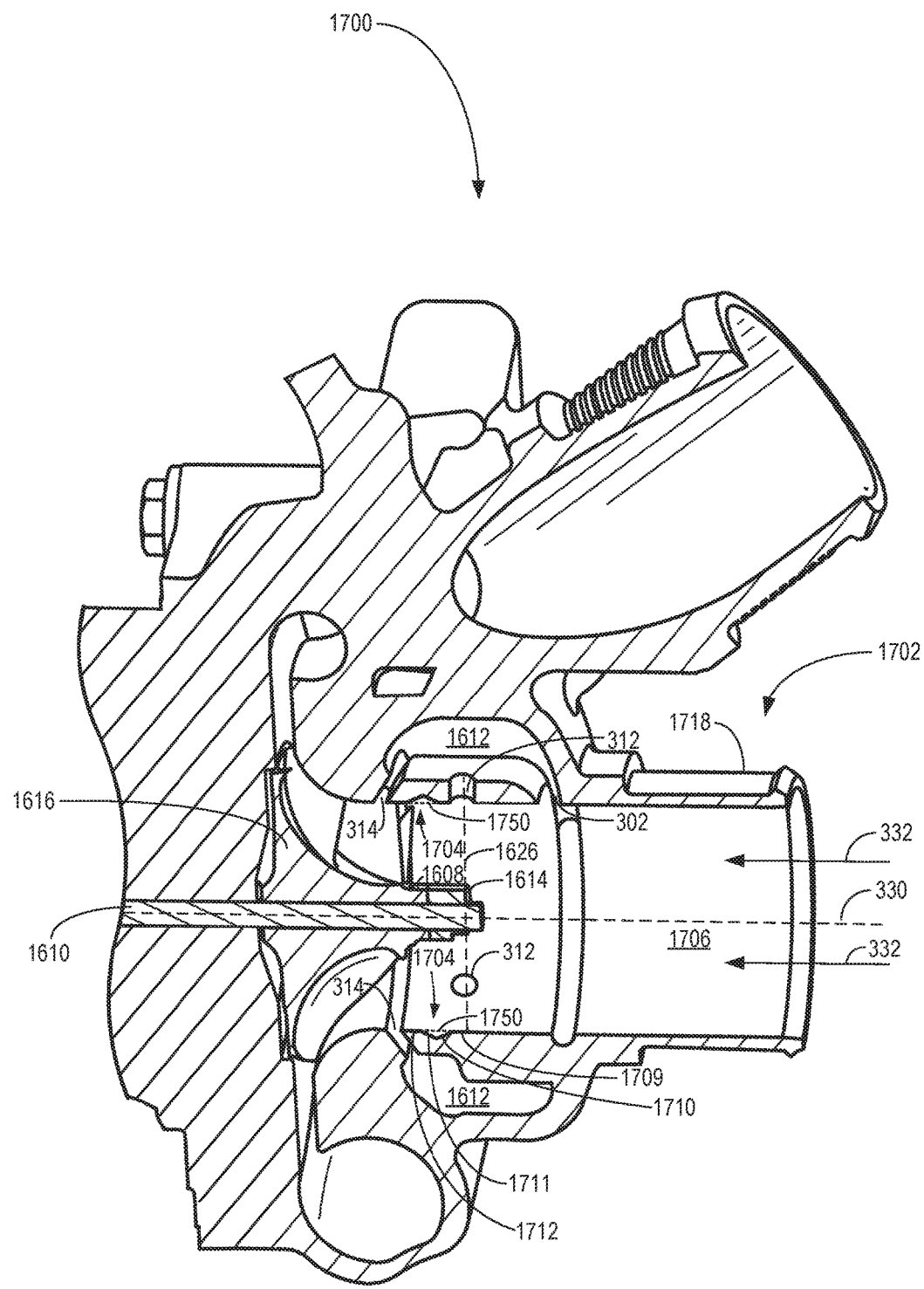
FIG. 16 shows a cross-sectional view of a compressor including a thirteenth embodiment of a flow disrupting feature and a plurality of flow disrupting apertures.

FIG. 16 shows another example compressor 1700, similar to the compressor 1600 shown by FIG. 15. Similar components included by both compressor 1700 and compressor 1600 are labeled similarly and may not be re-introduced during the description of compressor 1700 below.

Compressor 1700 includes a casing 1718, an inlet 1702, and a flow passage 1706. The flow passage 1706 includes a flow disrupting feature 1704. In the example shown by FIG. 16, the flow disrupting feature 1704 is formed by a first surface 1709, a second surface 1710, a third surface 1711, and a fourth surface 1712, with the first surface 1709 and fourth surface 1712 each positioned approximately parallel with the central axis 330, and with the second surface 1710 and third surface 1711 angled relative to the first surface 1709 and fourth surface 1712. The second surface 1710 is joined with the third surface 1711 at a location away from the central axis 330 relative to both of the first surface 1709 and fourth surface 1712. The second surface 1710 is additionally joined with the first surface 1709, and the third surface 1711 is additionally joined with the fourth surface 1712. In this configuration, a diameter of the flow passage 1706 at the location where the second surface 1710 is joined with the third surface 1711 is greater than a diameter of the flow passage 1706 at a location along either of the first surface 1709 or the fourth surface 1712.

In one example, the second surface 1710 may extend toward and join with the third surface 1711 without curvature, and the third surface 1711 may extend toward and join with the fourth surface 1712 without curvature. In other words, abrupt edges may be formed between each of the first surface 1709 and second surface 1710, between the second surface 1710 and third surface 1711, and between the third surface 1711 and fourth surface 1712. In another example, locations along which the first surface 1709 is joined with the second surface 1710, the second surface 1710 is joined with the third surface 1711, and the third surface 1711 is joined with the fourth surface 1712 may be curved such that together the first surface 1709, second surface 1710, third surface 1711, and fourth surface 1712 form a smooth region of the flow passage 1706 (e.g., a region without abrupt edges). Within the smooth region as described above, the diameter of the flow passage 1706 between the second surface 1710 and third surface 1711 is greater than the diameter of the flow passage 1706 at locations along either of the first surface 1709 or fourth surface 1712. In yet other examples, only the second surface 1710 and third surface 1711 may be curved (e.g., joined smoothly, as described above), only the first surface 1709 and second surface 1710 may be curved, etc.

In the embodiment shown by FIG. 16, the flow disrupting feature 1704 is positioned downstream of apertures 312 and downstream of the leading edge 1614 of the main blade 1608. In other words, the flow disrupting feature 1704 is positioned downstream (relative to incoming flow of inlet air 332) of the axis 1626 (as described above with reference to FIG. 15). In alternate embodiments, the flow disrupting feature 1704 may be positioned at least partially in-line with axis 1626 such that the axis 1626 intersects the flow disrupting feature 1704. In other embodiments, the flow disrupting feature 1704 may be positioned upstream of the axis 1626 (e.g., upstream of leading edge 1614). However, in each of the example embodiments described above, the bleed passage 314 is positioned downstream of the apertures 312, the apertures 312 are positioned downstream of the recirculation passage 302, and the flow disrupting feature 1704 is positioned between the bleed passage 314 and the apertures 312. In this way, air flowing out of resonance chamber 1612 via the apertures 312 may be further disrupted by the flow disrupting feature 1704 positioned downstream of apertures 312, thereby reducing an amount of noise produced by the air flowing through the compressor. Although the compressor 1600 shown by FIG. 15 and the compressor 1700 shown by FIG. 16 each include a flow disrupting feature (flow disrupting feature 1604 and flow disrupting feature 1704, respectively), alternate embodiments may not include a flow disrupting feature. In other words, in some examples, embodiments of a compressor including a plurality of apertures (e.g., apertures 312) as described above with reference to FIGS. 2-16 and below with reference to FIG. 17 may include a flow disrupting feature (e.g., such as those described above with reference to FIGS. 2-16), and in other examples, the compressor may not include a flow disrupting feature and may instead include a smooth and relatively straight (e.g., continuous, with a relatively uniform diameter) flow passage, as indicated by dashed line 1750 shown by FIG. 16. For example, dashed line 1750 indicates a shape of flow passage 1706 in an alternate embodiment of compressor 1700 that does not include flow disrupting feature 1704. Such embodiments still include the bleed passage, apertures, resonance chamber, and recirculation passage as described above, but do not include the flow disrupting feature.

FIG. 17 shows an example inlet 1803 of a compressor, such as the compressors shown by FIGS. 2-3, FIG. 9, and FIGS. 15-16. A flow passage 1801 is formed by the inlet 1803, similar to the flow passages described above with reference to the compressors described above. Central axis 330 is shown in order to illustrate a relative positioning of a plurality of apertures formed by the inlet 1803, similar to the apertures 312 shown by FIGS. 2-9 and FIGS. 10-16 and described above. For example, the inlet 1803 includes three apertures, with a first aperture 1810 shown by FIG. 17, and a position of a second aperture and a third aperture indicated at 1812 and 1814, respectively. First axis 1802 passes through a center of first aperture 1810 and is parallel with a direction along which first aperture 1810 extends relative to central axis 330. Second axis 1804 passes through a center of second aperture 1812 and is parallel with a direction along which second aperture 1812 extends relative to central axis 330. Third axis 1806 passes through a center of third aperture 1814 and is parallel with a direction along which third aperture 1814 extends relative to central axis 330.

In the example shown by FIG. 17, the first aperture 1810, second aperture 1812, and third aperture 1814 are angled relative to each other and positioned around the central axis 330. In other words, the first axis 1802 and second axis 1804 each intersect the central axis 330 (e.g., are positioned radially relative to the central axis 330) and are angled relative to each other by a first angle 1808. Additionally, the first axis 1802 and third axis 1806 each intersect the central axis 330 and are angled relative to each other by a second angle 1816, and the second axis 1804 and third axis 1806 are angled relative to each other by a third angle (not shown). In the example shown by FIG. 17, the first angle, second angle, and third angle are all a same amount (e.g., each of the first aperture 1810, second aperture 1812, and third aperture 1814 are angled relative to each adjacent aperture by a same amount and spaced apart from each adjacent aperture by a same amount). Alternate embodiments may include one or more apertures angled relative adjacent apertures by a different amount, and/or may include a different number of apertures, such as four, five, etc. For example, in some embodiments, a distance between the first aperture and the second aperture may be greater than a distance between the second aperture and the third aperture. Alternate embodiments may include an alternate configuration of spacing between apertures. Additionally, in some examples, the apertures may be positioned closer or further from a leading edge of at least one main blade of the compressor (e.g., leading edge 1614 shown by FIGS. 15-16), with each aperture still positioned between the bleed passage and the recirculation passage (e.g., bleed passage 314 and recirculation passage 302 shown by FIGS. 15-16). In yet other examples, each aperture may be positioned differently relative to each other aperture in a direction toward or away from the leading edge of the at least one main blade (e.g., in a direction of central axis 330).

In some examples, the apertures may have a different size (e.g., amount of opening) and/or shape than the examples shown by FIGS. 2-17. For example, in one embodiment, each aperture may have a diameter of four millimeters. In an alternate embodiment, each aperture may have a diameter of six millimeters. In yet another embodiment, one or more apertures may have a diameter of four millimeters, and the remaining apertures may have a diameter of six millimeters.

In further embodiments, alternate sizes (e.g., diameters) are possible, with each aperture having the same size, or one or more apertures having a different size relative to other apertures. In yet further examples, one or more apertures may have a different shape, such as an ellipse, rectangle, etc., with each aperture having the same shape, or one or more apertures having a different shape relative to other apertures.

FIGS. 18-26 each show separate embodiments of a compressor including a plurality of apertures and/or a flow disrupting feature. For example, FIGS. 18-20 show partial cross-sectional views of embodiments of compressors that include a plurality of apertures but do not include a flow disrupting feature, while FIGS. 21-26 show partial cross-sectional views of embodiments of compressors that include both a plurality of apertures and a flow disrupting feature. It is worth noting that the embodiments shown by FIGS. 21-26 may include any of the aperture arrangements shown by FIGS. 18-20 and described below.

FIG. 18 shows an example of a compressor including a resonance chamber 1850 (similar to resonance chamber 308 shown by FIG. 3, resonance chamber 1612 shown by FIGS. 16-17, etc.), a bleed passage 1856 (similar to bleed passage 314 shown by FIG. 3 and FIGS. 16-17), a recirculation passage 1858 (similar to recirculation passage 302 shown by FIG. 3 and FIGS. 16-17) positioned upstream of the bleed passage 1856, and a plurality of apertures 1860 (similar to apertures 312 shown by FIGS. 3-16) positioned between the recirculation passage 1858 and the bleed passage 1856.

A flow passage 1853 (similar to flow passage 304 shown by FIGS. 3-14, flow passage 1606 shown by FIG. 15, and flow passage 1706 shown by FIG. 16) includes a first surface 1859 positioned downstream of bleed passage 1856, a second surface 1862 positioned between the bleed passage 1856 and the apertures 1860 in the direction of central axis 330, and a third surface 1866 positioned upstream of the recirculation passage 1858. The first surface 1859, second surface 1862, and third surface 1866 are annular surfaces defining a shape of the flow passage 1853, similar to the examples shown by FIG. 2 and FIGS. 15-16. In the example shown by FIG. 18, the first surface 1859, second surface 1862, and third surface 1866 are each annular surfaces positioned a same distance around central axis 330. In other words, in the cross-sectional view shown by FIG. 18, the first surface 1859, second surface 1862, and third surface 1866 are shown parallel with each other and intersecting a shared axis 1851, with the shared axis 1851 arranged parallel with central axis 330 and positioned away from central axis 330.

In the example shown by FIG. 18, the apertures 1860 extend from the flow passage 1853 to the resonance chamber 1850 in a radial direction relative to the central axis 330. In other words, each aperture 1860 extends in a direction parallel with radial axis 1852. The apertures 1860 are formed by the second surface 1862 in a direction around the central axis 330 and are equidistant from both of the bleed passage 1856 and the recirculation passage 1858. As described above with reference to the apertures shown by FIG. 17, the apertures 1860 are not annular passages. Instead, each aperture 1860 has a circular or elliptical shape as viewed from the central axis 330, and each aperture 1860 is distinct from each other aperture 1860.

An alternate arrangement of apertures is shown by FIG. 19. In the example shown by FIG. 19, apertures 1902 extend from the flow passage 1853 to the resonance chamber 1850 in a direction angled relative to the central axis 330. In other words, axis 1904 intersects with the central axis 330 and is at an angle 1900 relative to the central axis 330, and each aperture 1902 extends along the axis 1904 between the flow passage 1853 and the resonance chamber 1850. While the axis 1904 is shown at an angle approximately forty-five degrees relative to the central axis 330, in alternate embodiments the axis 1904 may be angled relative to the central axis 330 by a different amount, such as twenty-five degrees, seventy-five degrees, etc. In each embodiment, the apertures 1902 extend along the axis 1904, such that each aperture 1902 is angled relative to the central axis 330 by a same amount as the axis 1904 is angled relative to the central axis 330. Additionally, although the apertures 1902 are angled relative to the central axis 330, each aperture 1902 is positioned equidistantly between the bleed passage 1856 and the recirculation passage 1858 as described above with reference to the apertures 1860 shown by FIG. 18. Some embodiments, such as the example shown by FIG. 20 and described below, may include one or more of the apertures positioned a different distance between the bleed passage 1856 and recirculation passage 1858.

FIG. 20 shows apertures 2002, similar to apertures 1860 shown by FIG. 18 and described above, positioned closer to bleed passage 1856 than recirculation passage 1858. In other words, one or more of the apertures 2002 may be positioned a first distance 2003 from the bleed passage 1856 and may be positioned a second distance 2005 from the recirculation passage 1858, with the second distance 2005 being greater than the first distance 2003. In alternate embodiments, the first distance 2003 and second distance 2005 may be different amounts of distance than shown by FIG. 20. For example, in one embodiment, the first distance 2003 may be a greater amount of distance than the second distance 2005, such that one or more of the apertures 2002 are positioned closer to the recirculation passage 1858 than the bleed passage 1856. Additionally, although the apertures 2002 shown by FIG. 20 are similar to the apertures 1860 shown by FIG. 18 (e.g., with the apertures 2002 extending radially relative to the central axis 330), alternate embodiments may include apertures at an angle relative to the central axis 330, such as the apertures 1902 shown by FIG. 19 and described above. In other words, alternate embodiments may include various combinations of aperture shape, position, size, etc. shown by FIGS. 18-20 and described above.

FIGS. 21-26 each show examples of a second flow disrupting feature (which may be referred to herein as an edge break or a narrowing and/or widening region of the flow passage), with the second flow disrupting feature being distinct and separate from the flow disrupting features described above with reference to FIGS. 3-16. FIGS. 21-26 each include an aperture arrangement similar to the embodiment shown by FIG. 18. It should be appreciated that the embodiments shown by FIGS. 21-26 may alternately include aperture arrangements (e.g., shape, size, position, etc.) similar to those shown by FIG. 19, FIG. 20, or described above.

Figure 21:
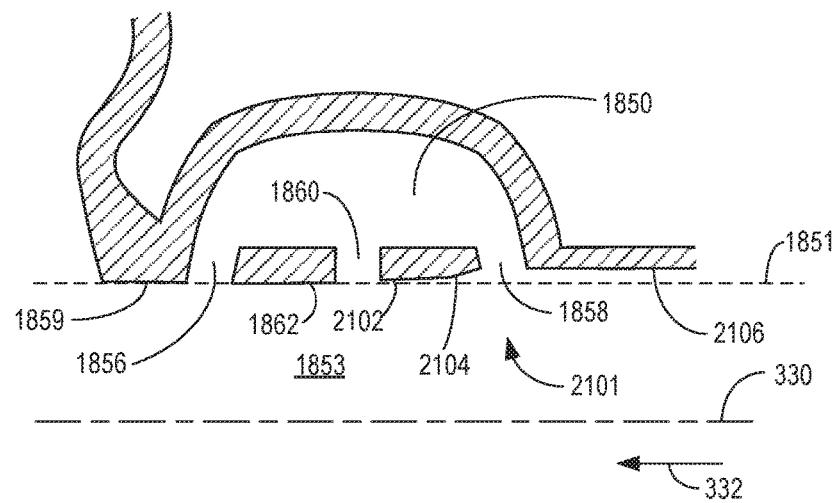
FIGS. 21-26 show various embodiments of compressors including a flow disrupting feature.

FIG. 21 shows a first example of an edge break 2101 positioned upstream of the bleed passage 1856 and the apertures 1860. The edge break 2101 includes a first receding surface 2102 extending in a direction angled relative to the central axis 330 by a first amount, a second receding surface 2104 extending in a direction angled relative to the central axis 330 by a second amount, and a parallel surface 2106 extending in a direction parallel with the central axis 330. The first receding surface 2102 is joined with the second receding surface 2104, and each of the first receding surface 2102 and second receding surface 2104 are formed by the second surface 1862. The first receding surface 2102 is arranged such that a distance from the central axis 330 to locations along the first receding surface 2102 is less than a distance from the central axis 330 to locations along the second receding surface 2104. In other words, the first receding surface 2012 and second receding surface 2104 each taper away from the central axis 330 in a direction opposite to a flow direction of the incoming flow of inlet air 332, with the second receding surface 2104 tapering away from the central axis 330 by a greater amount than the first receding surface 2102. The parallel surface 2106 is positioned such that a diameter of the flow passage 1853 at locations along the parallel surface 2106 is greater than a diameter of the flow passage 1853 at locations along both of the first receding surface 2102 and the second receding surface 2104.

Figure 22:
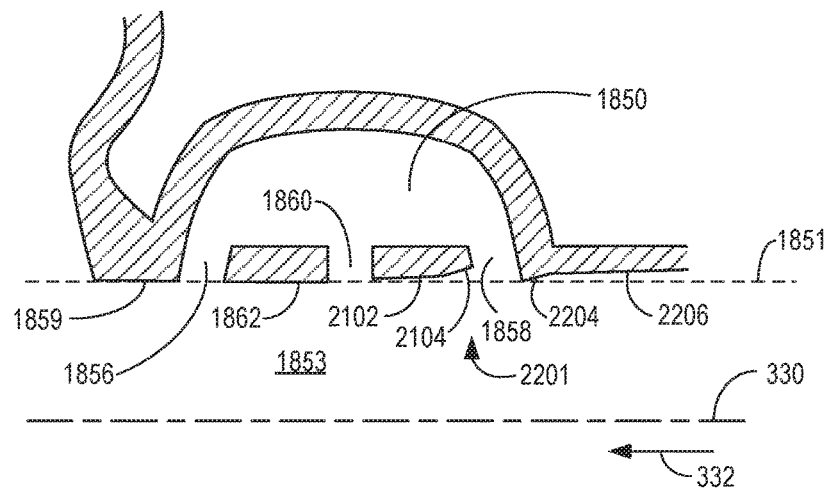

FIG. 22 shows a second example of an edge break positioned upstream of the bleed passage 1856 and the apertures 1860. Edge break 2201 shown by FIG. 22 includes the first receding surface 2102 and the second receding surface 2104 as described above with reference to FIG. 21, but does not include the parallel surface 2106 shown by FIG. 21. Instead, the edge break 2201 includes a third receding surface 2204 and a fourth receding surface 2206, with the third receding surface 2204 extending in a direction angled relative to the central axis 330 by a first amount, and the fourth receding surface 2206 extending in a direction angled relative to the central axis 330 by a second amount. The third receding surface 2204 and fourth receding surface 2206 are together positioned upstream of the recirculation passage 1858, similar to the parallel surface 2106 shown by FIG. 21 and described above, with the third receding surface 2204 joined to the fourth receding surface 2206. In this arrangement, a diameter of the flow passage at locations along the third receding surface 2204 is less than a diameter of the flow passage at locations along the fourth receding surface 2206. In other words, the third receding surface 2204 and fourth receding surface 2206 each taper away from the central axis 330 in a direction opposite to a flow direction of the incoming flow of inlet air 332 by different amounts.

Figure 23:
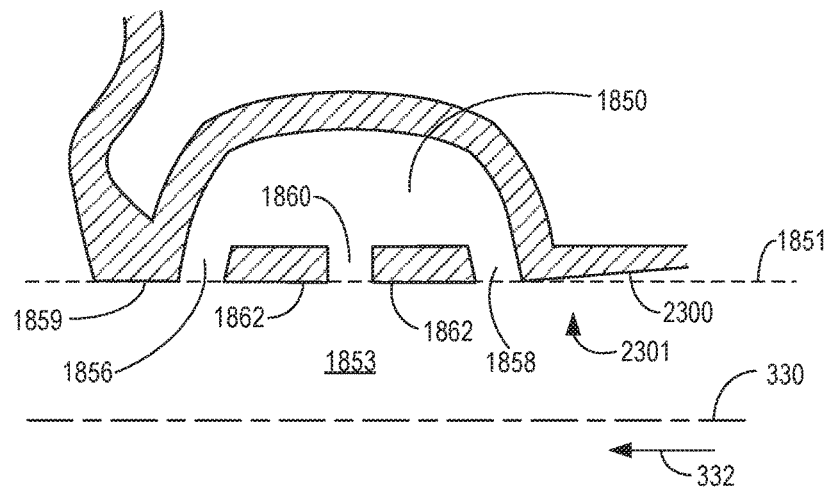

FIG. 23 shows an embodiment including an edge break 2301 that does not include the first receding surface 2102 and second receding surface 2104, and additionally includes a tapering surface 2300. In other words, the second surface 1862 does not taper away from the central axis 330 at locations upstream of the apertures 1860.

The tapering surface 2300 positioned upstream of the recirculation passage 1858 tapers away from the central axis 330 in a direction opposite to the incoming flow of inlet air 332. In contrast to the example of the third receding surface 2204 and the fourth receding surface 2206 shown by FIG. 22 and described above, the tapering surface 2300 forms a continuously tapering portion of the flow passage 1853. In other words, the tapering surface 2300 tapers from the recirculation passage 1858 in the direction opposite to the incoming flow of inlet air 332 (e.g., toward an inlet of the compressor) smoothly and without curvature or a change in angle relative to the central axis 330.

Figure 24:
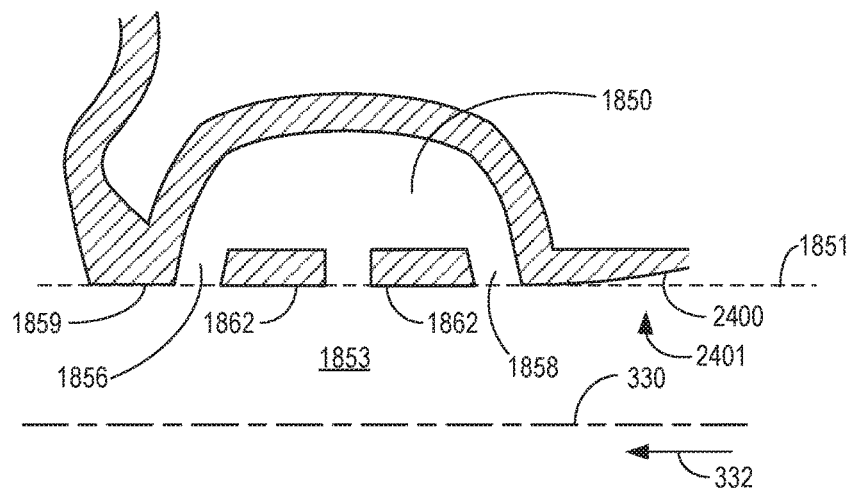

FIG. 24 shows another embodiment including an edge break 2401. The edge break 2401 includes a continuously curved surface 2400 in contrast with the tapering surface 2300 shown by FIG. 23 and described above. The continuously curved surface 2400 curves away from the central axis 330 and the recirculation passage 1858 in the direction opposite to the incoming flow of inlet air 332. In other words, diameters of the flow passage 1853 at locations along the continuously curved surface 2400 become larger as a distance from the recirculation passage 1858 increases (e.g., a diameter at a first location upstream of the recirculation passage is less than a diameter at a second location upstream of the recirculation passage, with the second location being further upstream than the first location relative to the incoming flow of inlet air).

FIG. 25 shows an embodiment including an edge break 2501 positioned downstream of the bleed passage 1856. The edge break 2501 includes a straight surface 2500 and an angled surface 2502, with the straight surface 2500 extending in a direction parallel with the central axis 330 (e.g., parallel with the second surface 1862 and third surface 1866), and the angled surface 2502 extending in an angled direction relative to the central axis 330. The straight surface 2500 is joined with the angled surface 2502. A diameter of the flow passage 1853 at the location where the angled surface 2502 joins with the straight surface 2500 is less than a diameter of the flow passage 1853 at the location where the angled surface 2502 abuts the bleed passage 1856. In other words, the angled surface 2502 extends away from the central axis and the straight surface 2500 the direction opposite to the incoming flow of inlet air 332.

FIG. 26 shows an embodiment including an edge break 2601 positioned upstream of the bleed passage 1856 and downstream of the apertures 1860. The edge break 2601 includes an angled surface 2600 formed by the second surface 1862. The angled surface 2600 extends away from the central axis 330 and towards the bleed passage 1856. In other words, a diameter of the flow passage 1853 at the location where the angled surface 2600 joins with the second surface 1862 is less than a diameter of the flow passage 1853 at the location where the angled surface 2600 abuts the bleed passage 1856.

Although the examples shown by FIGS. 2-26 are depicted as separate embodiments, alternate embodiments may include combinations of the flow disrupting features and apertures described above. For example, in one embodiment, a compressor may include a plurality of apertures positioned between a bleed passage and a recirculation passage, a first flow disrupting feature positioned downstream of the apertures, and a second flow disrupting feature (e.g., an edge break) positioned upstream of the apertures and downstream of an inlet of the compressor, with the apertures extending in a radial direction relative to a central axis of the compressor. In another example, a compressor may include a first flow disrupting feature, a second flow disrupting feature, and apertures as described above, with the apertures extending in an angled direction relative a the central axis of the compressor. In yet another example, a compressor may include a plurality of apertures and only one flow disrupting feature positioned either upstream of downstream of the apertures. Further embodiments may include different combinations of flow disrupting features and/or apertures.

FIGS. 2-26 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

By surrounding the flow passage of the compressor with the resonance chamber, and by fluidly coupling the flow passage to the resonance chamber via the bleed passage and the recirculation passage, air may flow into the resonance chamber via the bleed passage as the compressor wheel rotates. A first amount of air flowing through the resonance chamber may flow out of the resonance chamber via the recirculation passage and re-enter the flow passage. By flowing air through the resonance chamber and flow chamber in this way, an amount of noise produced by the flow of the air may be reduced. Additionally, by including the apertures between the bleed passage and the recirculation passage as described above, a second amount of air may flow from the resonance chamber to the flow passage, with the second amount being less than the first amount. In this way, a pressure within the resonance chamber may be reduced, thereby further reducing an amount of sound produced by the flow of air. In some embodiments, a flow disrupting feature may be included within the flow passage, with the flow disrupting feature configured to disrupt (e.g., alter) the flow of air through the flow passage. By disrupting the flow of air through the flow passage via the flow disrupting feature, the amount of sound produced by the flow of air may be further reduced. Together, the resonance chamber, apertures, and flow disrupting feature may more greatly reduce the amount of noise produced by the flow of air through the compressor than an amount of noise reduced by the resonance chamber alone.

In one embodiment, a compressor includes: a casing; a flow passage formed by an interior surface of the casing; a compressor wheel located in the casing downstream of the flow passage and having at least one main blade; a resonance chamber formed within the casing, surrounding the flow passage, and fluidly coupled to the flow passage via a recirculation passage and a bleed passage; and an aperture formed between the resonance chamber and the flow passage, and coupled to the flow passage between the recirculation passage and the bleed passage. In a first example of the compressor, the compressor includes a flow disrupting feature formed by the interior surface of the flow passage and positioned between the bleed passage and the aperture within the flow passage, in a direction of a central axis of the compressor. A second example of the compressor optionally includes the first example, and further includes wherein the flow disrupting feature is an annular flow disrupting feature extending along an inner perimeter of the flow passage and around a central axis of the compressor. A third example of the compressor optionally includes one or each of the first and second examples, and further includes wherein the flow disrupting feature includes a leading edge surface splaying radially outward in a direction away from the central axis and a trailing edge surface located proximate to a leading edge of the at least one main blade and arranged perpendicular to the central axis. A fourth example of the compressor optionally includes one or more or each of the first through third examples, and further includes wherein the leading edge of the at least one main blade is positioned upstream of the flow disrupting feature. A fifth example of the compressor optionally includes one or more or each of the first through fourth examples, and further includes wherein the flow disrupting feature includes a first surface defining a first diameter of the flow passage, a second surface defining a second diameter of the flow passage, and a third surface angled relative to both of the first surface and second surface and joining the first surface to the second surface. A sixth example of the compressor optionally includes one or more or each of the first through fifth examples, and further includes wherein the flow disrupting feature includes a first surface and a second surface extending in a direction parallel with the central axis, a third surface and a fourth surface angled relative to the first surface and second surface and positioned between the first surface and second surface, and wherein a diameter of the flow passage along both of the first surface and second surface is less than a diameter of the flow passage along both of the third surface and fourth surface. A seventh example of the compressor optionally includes one or more or each of the first through sixth examples, and further includes wherein the aperture is arranged between the recirculation passage and the bleed passage along the flow passage, in a direction of a central axis of the compressor, and wherein the aperture is one of a plurality of apertures positioned between the recirculation passage and the bleed passage. An eighth example of the compressor optionally includes one or more or each of the first through seventh examples, and further includes wherein each aperture of the plurality of apertures is positioned radially around the central axis. A ninth example of the compressor optionally includes one or more or each of the first through eighth examples, and further includes wherein each aperture of the plurality of apertures is formed as a cylindrical opening extending between the resonance chamber and the flow passage. A tenth example of the compressor optionally includes one or more or each of the first through ninth examples, and further includes a flow disrupting feature formed by the flow passage and positioned upstream of the plurality of apertures relative to a flow direction of inlet air through the flow passage, and wherein a diameter of the flow passage along the flow disrupting feature is less than a diameter at an inlet of the flow passage.

In another embodiment, a compressor includes: a casing having a central axis; a compressor wheel located in the casing and having a main blade rotatable within the casing about the central axis; a flow passage positioned within the casing and at least partially upstream of the compressor wheel; a chamber positioned within the casing and surrounding an outer perimeter of the flow passage, the chamber fluidly coupled to the flow passage by a bleed passage and a recirculation passage; and an annular flow disrupting feature on the flow passage, positioned downstream of the aperture and upstream of the bleed passage, the annular flow disrupting feature including a leading edge surface, a trailing edge surface, and an angled surface joining the leading edge surface to the trailing edge surface, with the trailing edge surface located proximate to a leading edge of the main blade. In a first example of the compressor, the compressor includes an aperture fluidly coupling the chamber with the flow passage, the aperture positioned between the bleed passage and the recirculation passage along the flow passage, in a direction of the central axis. A second example of the compressor optionally includes the first example, and further includes wherein the aperture is one of a plurality of apertures positioned between the bleed passage and the recirculation passage, wherein the plurality of apertures is arranged radially relative to the central axis of the compressor, and wherein each aperture of the plurality of apertures is formed as a cylindrical opening between the chamber and the flow passage. A third example of the compressor optionally includes one or each of the first and second examples, and further includes wherein a first axis positioned radially relative to the central axis and passing through a center of a first aperture of the plurality of apertures is angled by a first angle relative to a second axis positioned radially relative to the central axis and passing through a center of a second aperture of the plurality of apertures, wherein the first aperture is adjacent to the second aperture, and wherein an angle between each pair of adjacent apertures of the plurality of apertures in a direction around the central axis is the same as the first angle. A fourth example of the compressor optionally includes one or more or each of the first through third examples, and further includes wherein each aperture of the plurality of apertures is distinct and separate from each other aperture, and wherein no aperture of the plurality of apertures is formed by either of the bleed passage or the recirculation passage. A fifth example of the compressor optionally includes one or more or each of the first through fourth examples, and further includes wherein the bleed passage is positioned downstream of the leading edge of the main blade and the recirculation passage is positioned upstream of the leading edge of the main blade, relative to a direction of the central axis.

In another embodiment, a compressor includes: an inlet flow passage positioned within a casing of the compressor; a compressor wheel located in the casing, downstream of the inlet flow passage, and having a main blade configured to rotate about a central axis of the inlet flow passage; a first annular passage positioned upstream of a leading edge of the main blade and coupling the inlet flow passage to an annular chamber surrounding the inlet flow passage; a second annular passage positioned downstream of the leading edge of the main blade and coupling the inlet flow passage to the annular chamber; a plurality of apertures positioned between, in a direction of the central axis, the first annular passage and the second annular passage and coupling the inlet flow passage with the annular chamber; and a flow disrupting feature positioned along an inner surface of the inlet flow passage between the second annular passage and the plurality of apertures, the flow disrupting feature including a leading edge surface, a trailing edge surface, and at least one angled surface joined between the leading edge surface and the trailing edge surface. In a first example of the compressor, the leading edge surface and trailing edge surface are positioned approximately parallel with the central axis, wherein the leading edge surface is positioned a greater distance from the central axis than the trailing edge surface in a radial direction relative to the central axis, and wherein the at least one angled surface includes exactly one angled surface joining the leading edge surface with the trailing edge surface. A second example of the compressor optionally includes the first example, and further includes wherein the leading edge surface and trailing edge surface are positioned approximately parallel with the central axis, and wherein the at least one angled surface includes a first angled surface and a second angled surface, the first angled surface joined with the second angled surface at a location away from each of the central axis, the leading edge surface, and the trailing edge surface, in a radial direction relative to the central axis.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A compressor, comprising:
   a casing;
   a flow passage formed by an interior surface of the casing;
   a compressor wheel located in the casing downstream of the flow passage and having at least one main blade;
   a resonance chamber formed within the casing, surrounding the flow passage, and fluidly coupled to the flow passage via a recirculation passage and a bleed passage; and
   an aperture formed between the resonance chamber and the flow passage, and coupled to the flow passage between the recirculation passage and the bleed passage.

2. The compressor of claim 1, further comprising a flow disrupting feature formed by the interior surface of the flow passage and positioned between the bleed passage and the aperture within the flow passage, in a direction of a central axis of the compressor.

3. The compressor of claim 2, wherein the flow disrupting feature is an annular flow disrupting feature extending along an inner perimeter of the flow passage and around a central axis of the compressor.

4. The compressor of claim 3, wherein the flow disrupting feature includes a leading edge surface splaying radially outward in a direction away from the central axis and a trailing edge surface located proximate to a leading edge of the at least one main blade and arranged perpendicular to the central axis.

5. The compressor of claim 4, wherein the leading edge of the at least one main blade is positioned upstream of the flow disrupting feature.

6. The compressor of claim 3, wherein the flow disrupting feature includes a first surface defining a first diameter of the flow passage, a second surface defining a second diameter of the flow passage, and a third surface angled relative to both of the first surface and second surface and joining the first surface to the second surface.

7. The compressor of claim 3, wherein the flow disrupting feature includes a first surface and a second surface extending in a direction parallel with the central axis, a third surface and a fourth surface angled relative to the first surface and second surface and positioned between the first surface and second surface, and wherein a diameter of the flow passage along both of the first surface and second surface is less than a diameter of the flow passage along both of the third surface and fourth surface.

8. The compressor of claim 1, wherein the aperture is arranged between the recirculation passage and the bleed passage along the flow passage, in a direction of a central axis of the compressor, and wherein the aperture is one of a plurality of apertures positioned between the recirculation passage and the bleed passage.

9. The compressor of claim 8, wherein each aperture of the plurality of apertures is positioned radially around the central axis.

10. The compressor of claim 8, wherein each aperture of the plurality of apertures is formed as a cylindrical opening extending between the resonance chamber and the flow passage.

11. The compressor of claim 8, further comprising a flow disrupting feature formed by the flow passage and positioned upstream of the plurality of apertures relative to a flow direction of inlet air through the flow passage, and wherein a diameter of the flow passage along the flow disrupting feature is less than a diameter at an inlet of the flow passage.

12. A compressor, comprising:
   a casing having a central axis;
   a compressor wheel located in the casing and having a main blade rotatable within the casing about the central axis;
   a flow passage positioned within the casing and at least partially upstream of the compressor wheel;
   a chamber positioned within the casing and surrounding an outer perimeter of the recirculation passage, the chamber fluidly coupled to the flow passage by a bleed passage and a recirculation passage;

an annular flow disrupting feature on the flow passage, positioned downstream of the aperture and upstream of the bleed passage, the annular flow disrupting feature including a leading edge surface, a trailing edge surface, and an angled surface joining the leading edge surface to the trailing edge surface, with the trailing edge surface located proximate to a leading edge of the main blade; and further comprising an aperture fluidly coupling the chamber with the flow passage, the aperture positioned between the bleed passage and the recirculation passage along the flow passage, in a direction of the central axis.

13. The compressor of claim 12, wherein the aperture is one of a plurality of apertures positioned between the bleed passage and the recirculation passage, wherein the plurality of apertures is arranged radially relative to the central axis of the compressor, and wherein each aperture of the plurality of apertures is formed as a cylindrical opening between the chamber and the flow passage.

14. The compressor of claim 13, wherein a first axis positioned radially relative to the central axis and passing through a center of a first aperture of the plurality of apertures is angled by a first angle relative to a second axis positioned radially relative to the central axis and passing through a center of a second aperture of the plurality of apertures, wherein the first aperture is adjacent to the second aperture, and wherein an angle between each pair of adjacent apertures of the plurality of apertures in a direction around the central axis is the same as the first angle.

15. The compressor of claim 13, wherein each aperture of the plurality of apertures is distinct and separate from each other aperture, and wherein no aperture of the plurality of apertures is formed by either of the bleed passage or the recirculation passage.

16. The compressor of claim 15, wherein the bleed passage is positioned downstream of the leading edge of the main blade and the recirculation passage is positioned upstream of the leading edge of the main blade, relative to a direction of the central axis.

17. A compressor, comprising:

an inlet flow passage positioned within a casing of the compressor;

a compressor wheel located in the casing, downstream of the inlet flow passage, and having a main blade configured to rotate about a central axis of the inlet flow passage;

a first annular passage positioned upstream of a leading edge of the main blade and coupling the inlet flow passage to an annular chamber surrounding the inlet flow passage;

a second annular passage positioned downstream of the leading edge of the main blade and coupling the inlet flow passage to the annular chamber;

a plurality of apertures positioned between, in a direction of the central axis, the first annular passage and the second annular passage and coupling the inlet flow passage with the annular chamber; and a flow disrupting feature positioned along an inner surface of the inlet flow passage between the second annular passage and the plurality of apertures, the flow disrupting feature including a leading edge surface, a trailing edge surface, and at least one angled surface joined between the leading edge surface and the trailing edge surface.

18. The compressor of claim 17, wherein the leading edge surface and trailing edge surface are positioned approximately parallel with the central axis, wherein the leading edge surface is positioned a greater distance from the central axis than the trailing edge surface in a radial direction relative to the central axis, and wherein the at least one angled surface includes exactly one angled surface joining the leading edge surface with the trailing edge surface.

19. The compressor of claim 17, wherein the leading edge surface and trailing edge surface are positioned approximately parallel with the central axis, and wherein the at least one angled surface includes a first angled surface and a second angled surface, the first angled surface joined with the second angled surface at a location away from each of the central axis, the leading edge surface, and the trailing edge surface, in a radial direction relative to the central axis.

* * * * *